US011404087B1

(12) United States Patent
Khalilia et al.

(10) Patent No.: US 11,404,087 B1
(45) Date of Patent: Aug. 2, 2022

(54) FACIAL FEATURE LOCATION-BASED AUDIO FRAME REPLACEMENT

(71) Applicant: Amazon Technologies, Inc., Seattle, WA (US)

(72) Inventors: Mohammed Khalilia, Seattle, WA (US); Pragyana K. Mishra, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/194,889

(22) Filed: Mar. 8, 2021

(51) Int. Cl.

| | |
|---|---|
| ***H04N 5/93*** | (2006.01) |
| ***G11B 27/036*** | (2006.01) |
| ***G06T 7/73*** | (2017.01) |
| ***G10L 15/22*** | (2006.01) |
| ***G10L 15/25*** | (2013.01) |
| ***G06V 40/16*** | (2022.01) |
| *H04N 7/15* | (2006.01) |

(52) U.S. Cl.
CPC .............. *G11B 27/036* (2013.01); *G06T 7/73* (2017.01); *G06V 40/168* (2022.01); *G10L 15/22* (2013.01); *G10L 15/25* (2013.01); *G06T 2207/10016* (2013.01); *G06T 2207/20081* (2013.01); *G06T 2207/30201* (2013.01); *H04N 7/15* (2013.01)

(58) Field of Classification Search
CPC .................... G11B 27/036; G06T 7/73; G06T 2207/30201; G06T 2207/10016; G06T 2207/20081; G10L 15/22; G10L 15/25; G06V 40/168; H04N 7/15
USPC ................ 386/285, 278, 281, 280, 287, 288
See application file for complete search history.

(56) References Cited

U.S. PATENT DOCUMENTS

| | | | |
|---|---|---|---|
| 9,560,315 | B1 | 1/2017 | Silberman et al. |
| 10,904,488 | B1 | 1/2021 | Weisz et al. |
| 2003/0023910 | A1 | 1/2003 | Myler |
| 2006/0123445 | A1 | 6/2006 | Sullivan et al. |
| 2007/0242066 | A1 | 10/2007 | Levy |
| 2008/0231686 | A1 | 9/2008 | Redlich |

(Continued)

FOREIGN PATENT DOCUMENTS

WO WO 2020/018458 A1 1/2020

OTHER PUBLICATIONS

U.S. Appl. No. 17/194,653, filed Mar. 8, 2021, Khalilia et al.

(Continued)

*Primary Examiner* — Robert Chevalier
(74) *Attorney, Agent, or Firm* — BakerHostetler

(57) ABSTRACT

Played audio frames included in first audio content may be received over one or more networks. The first audio content may further include a replaced audio frame. The first audio content may correspond to video content that includes video of a face of a person as the person utters speech that is captured in the first audio content. Location data may also be received over the one or more networks. The location data may indicate locations of facial features of the face of the person in a video frame of the video content. The video frame may correspond to the replaced audio frame. Audio output may be generated that approximates a portion of the speech corresponding to the replaced audio frame. The audio output may be inserted into a replacement audio frame. Second audio content may be played including the played audio frames and the replacement audio frame.

20 Claims, 16 Drawing Sheets

610 Receive a first input audio sample including first verbal content having a first speaking style 612 Receive a second input audio sample including second verbal content having a second speaking style 614 Generate a first frequency-domain representation of the first input audio sample 616 Generate a second frequency-domain representation of the second input audio sample 618 Encode, by a content-extraction encoder, the first frequency-domain representation to form content-extracted data that represents the first verbal content independently of the first speaking style 620 Encode, by a style-extraction encoder, the second frequency-domain representation to form style-extracted data that represents the second speaking style independently of the second verbal content 622 Decode, by a decoder, the content-extracted data and the style-extracted data to form output data that represents the first verbal content and the second speaking style 624 Generate, based on the output data, an output audio sample that includes the first verbal content having the second speaking style

(56) References Cited

U.S. PATENT DOCUMENTS

| | | | | |
|---|---|---|---|---|
| 2010/0295920 | A1 | 11/2010 | McGowan | |
| 2016/0205428 | A1* | 7/2016 | McDonough | H04N 21/4524 725/31 |
| 2016/0301727 | A1 | 10/2016 | Barjonas et al. | |
| 2018/0089880 | A1 | 3/2018 | Garrido et al. | |
| 2020/0358983 | A1 | 11/2020 | Astarabadi et al. | |
| 2021/0329338 | A1* | 10/2021 | Khov | H04N 21/4665 |

OTHER PUBLICATIONS

U.S. Appl. No. 17/084,347, filed Oct. 29, 2000, Johnson et al.

Wang et al.; "Image Inpainting via Generative Multi-column Convolutional Neural Networks"; Computer Vision and Pattern Recognition; Oct. 2018; 10 pages.

Prenger et al.; "WaveGlow: A Flow-based Generative Network for Speech Synthesis"; Artificial Intelligence, Machine Learning, Audio and Speech Processing, Machine Learning; Oct. 2018; 5 pages.

Ulyanov et al.; "Deep Image Prior"; Proceedings of the IEEE Conf. on Computer Vision and Pattern Recognition; May 2020; 23 pages.

Perraudin et al.; "Inpainting of long audio segments with similarity graphs"; Artificial Intelligence, Multimedia, Software Engineering; Feb. 2018; 13 pages.

Qu et al.; "LipSound: Neural Mel-spectrogram Reconstruction for Lip Reading"; Interspeech; Sep. 2019; p. 2768-2772.

"Facial Action Coding System", Wikipedia, https://en.wikipedia.org/wiki/Facial_Action_Coding_System, web-archive capture from Aug. 7, 2020, accessed on Jul. 26, 2021 from https://web.archive.org/web/20200807130644/https://en.wikipedia.org/wiki/Facial_Action_Coding_System; 10 pages.

Nithiroj Tripatarasit; "Facial Keypoints Detection with PyTorch"; https://medium.com/diving-in-deep/facial-keypoints-detection-with-pytorch-86bac79141e4; May 2019; accessed Sep. 7, 2021; 29 pages.

Wang et al.; "Deep Learning for Image Super-resolution: A Survey"; IEEE Computer Vision and Pattern Recognition; Feb. 2020; 24 pages.

Liu et al.; "Video Super Resolution Based on Deep Learning: A Comprehensive Survey"; Computer Vision and Pattern Recognition; Jul. 2020; 24 pages.

Yang et al.; "Learning Texture Transformer Network for Image Super-Resolution"; Computer Vision and Pattern Recognition; Jun. 2020; 22 pages.

Han et al.; "A Survey on Visual Transformer"; Computer Vision and Pattern Recognition; Jan. 2021; 26 pages.

Liu et al.; "Video Super Resolution Based on Deep Learning: A Comprehensive Survey"; Computer Vision and Pattern Recognition; Dec. 2020; 30 pages.

* cited by examiner

| Video Frame 800 | Video Frame 900 |
| --- | --- |
| Audio Frame 801 | Audio Frame 901 |

| Video Frame 800 | Video Frame 900 |
|---|---|
| Audio Frame 801 | Audio Frame 901 |

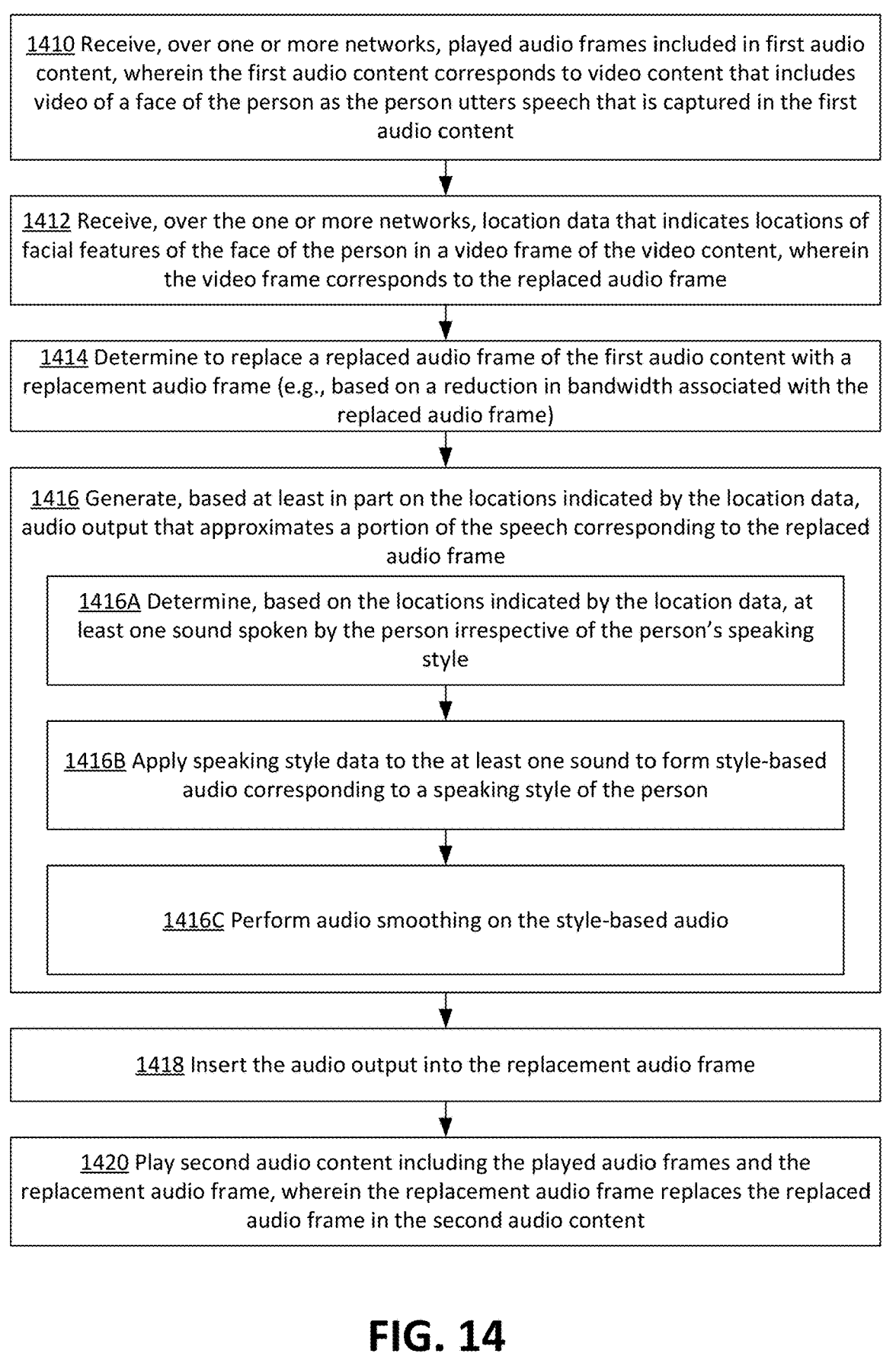

1410 Receive, over one or more networks, played audio frames included in first audio content, wherein the first audio content corresponds to video content that includes video of a face of the person as the person utters speech that is captured in the first audio content 1412 Receive, over the one or more networks, location data that indicates locations of facial features of the face of the person in a video frame of the video content, wherein the video frame corresponds to the replaced audio frame 1414 Determine to replace a replaced audio frame of the first audio content with a replacement audio frame (e.g., based on a reduction in bandwidth associated with the replaced audio frame)

1416 Generate, based at least in part on the locations indicated by the location data, audio output that approximates a portion of the speech corresponding to the replaced audio frame 1416A Determine, based on the locations indicated by the location data, at least one sound spoken by the person irrespective of the person's speaking style 1416B Apply speaking style data to the at least one sound to form style-based audio corresponding to a speaking style of the person 1416C Perform audio smoothing on the style-based audio 1418 Insert the audio output into the replacement audio frame 1420 Play second audio content including the played audio frames and the replacement audio frame, wherein the replacement audio frame replaces the replaced audio frame in the second audio content

FIG. 14

FACIAL FEATURE LOCATION-BASED AUDIO FRAME REPLACEMENT

CROSS-REFERENCE TO RELATED APPLICATIONS

This application is related to the following application, which is hereby incorporated by reference in its entirety: U.S. patent application Ser. No. 17/084,347 filed Oct. 29, 2020, entitled "VIDEO FRAME REPLACEMENT BASED ON AUXILIARY DATA". This application is also related to the following application, which is hereby incorporated by reference in its entirety: U.S. patent application Ser. No. 17/194,653 filed Mar. 8, 2021, entitled "AUDIO ENCODING AND DECODING FOR SPEAKING STYLE TRANSFER".

BACKGROUND

The popularity of audio-video conferencing has increased rapidly in recent years. Audio-video conferencing tools may allow multiple people at multiple different locations to interact by receiving both audio and video of one another. This may allow for more personal and detailed interactions between people participating in the audio-video conference, such as opposed to a mere telephone conference. For example, instead of merely hearing each other's voices, audio-video conferencing tools may allow participants to see each other's facial expressions and movements, thereby more closely simulating actual face-to-face interactions between people in the same room or other physical space. While audio-video conferencing provides many advantages, the transfer of audio and video over bandwidth-constrained networks may also involve several challenges. For example, in certain conditions, existing network bandwidth may be insufficient to support all incoming audio and video feeds, thereby resulting in quality degradation, lost audio and video frames, interrupted audio and video feeds, and other problems. In some examples, these problems may occur when available bandwidth temporarily drops, when large numbers of participants join the audio-audio-audio-video conference, or for other reasons.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 14 is a flowchart illustrating an example audio frame replacement process that may be used in accordance with the present disclosure.

DETAILED DESCRIPTION

Figure 1:
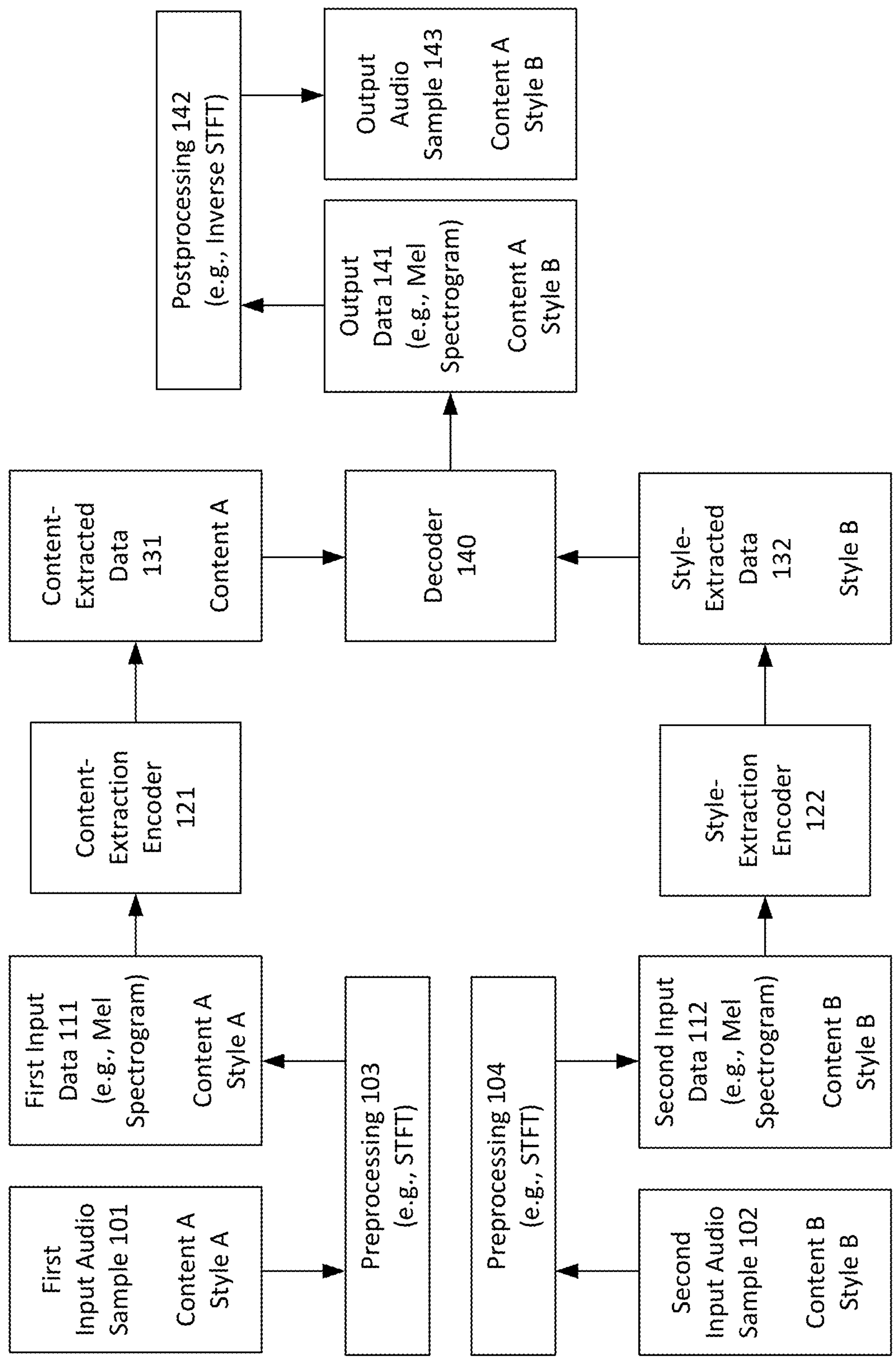
FIG. 1 is a diagram illustrating an example speaking style transfer system that may be used in accordance with the present disclosure.

Techniques for audio encoding and decoding for speaking style transfer are described herein. In some examples, a first input audio sample may be received. The first input audio sample may include first verbal content having a first speaking style. The term speaking style, as used herein, refers to nonphonemic paralinguistic speaking characteristics, such as pitch, tone, volume, intonation and prosody. The term verbal content, as used herein, refers to spoken sounds and/or words without regard to the speaking style of the words. In some examples, the first input audio sample may be created as a translation of a portion of an audio soundtrack of a media item with a corresponding video track, such as a movie. In one specific example, the movie may be originally made in the English language and may include a famous English-speaking actor with a distinct and well-known speaking style. The first input audio sample may include a translation, from English to French, of words that are spoken by the famous actor in the movie. The first input audio sample may include French words that are spoken by a French-speaking voice, such as a human voice of a French-speaking human translator or a machine-generated voice. Thus, while the first input audio sample may include an accurate translation of words spoken by the famous actor, the first input audio sample may not capture the actor's speaking style, such as the actor's pitch, tone, volume, intonation and prosody.

The techniques described herein may allow generation of an output audio sample with the same verbal content (i.e., the first verbal content) as the first input audio sample but having a different speaking style (i.e., a second speaking style), such as the speaking style of the famous actor that originally spoke the words in English. Thus, the output audio sample may include a French translation of the actor's original English words, and the output audio sample may also have the same speaking style as the actor. In some examples, the output audio sample may be included in a French soundtrack for the movie. The ability to capture the actor's speaking style in the French translation may cause the French translation to appear more natural and realistic to movie viewers, particularly in cases when the viewers are familiar with the actor's speaking style.

In order to generate the output sample having the actor's speaking style, a second input audio sample may also be provided. The second input audio sample may include different verbal content (i.e., second verbal content) that is spoken in the second speaking style. For example, the second input audio sample may include a sample of words that are spoken by the famous movie actor. The style transfer process may be performed using a content-extraction encoder, a style-extraction encoder, and a specialized decoder. The content extraction encoder may be trained to extract representations of verbal content from audio data independently of the speaking style of the audio data. By contrast, the style-extraction encoder may be trained to extract representations of speaking style from audio data independently of verbal content of the audio data. Additionally, the decoder may be trained to combine and decode extracted verbal content data and extracted speaking style data into an output representation of speech.

In order to perform the style transfer process, first input data (e.g., a mel spectrogram) representing the first input audio sample may be generated, such as by performing a Short-time Fourier transform (STFT) on the first input audio sample. The first input data may then be provided to the content-extraction encoder, which may encode the first input data to form content-extracted data that represents the first verbal content independently of the first speaking style. Additionally, second input data (e.g., a mel spectrogram) representing the second input audio sample may be generated, such as by performing an STFT on the second input audio sample. The second input data may then be provided to the style-extraction encoder, which may encode the second input data to form style-extracted data that represents the second speaking style independently of the second verbal content. The content-extracted data and the style-extracted data may then be provided to the specialized decoder, which may decode those data sets to form output data (e.g., a mel spectrogram) that represents the first verbal content and the second speaking style. The output audio sample may then be generated based on the output data, such as by performing an Inverse STFT on the output data.

In some examples, the style-extraction encoder, the content-extraction encoder, and the specialized decoder may be trained using a three phase training process. A first phase may include training of the style-extraction encoder. A second phase may include training of the content-extraction encoder. A third phase may include training of the specialized decoder. In some examples, the first and second phases, which include training of the encoders, may be performed wholly are partially simultaneously with one another or in any order with respect to one another. By contrast, in some examples, the third phase, which may include training of the decoder, may be performed after completion of both the first and the second phases. Performing of decoder training after encoder training may allow encoding parameters of both encoders and their connections to the decoder to be frozen (i.e., not updated) during the decoder training. This helps to prevent unlearning of weights for the style-extraction encoding and the content-extraction encoding, so that the separation of content and style are not lost.

In the first training phase, the style-extraction encoder may be trained using pairs of training samples. Each training sample pair may include a respective first training sample and a respective second training sample that include different verbal content but that are spoken with an identical speaking style. For example, in some cases, the first training sample and the second training sample may include different time segments of speech from the same speaker. First training data (e.g., a mel spectrogram) representing the first training sample may be provided to the style-extraction encoder, which may encode the first training data to form style-extracted training data that represents the speaking style of the first training sample independently of the verbal content of the first training sample. The style-extracted training data may then be decoded to form reconstructed first training data (e.g., a mel spectrogram) that represents the speaking style of the first training sample independently of the verbal content of the first training sample. The reconstructed first training data may then be compared to second training data, which may be a representation (e.g., mel spectrogram) of the second training sample. Differences between the reconstructed first training data and the second training data may be determined, and the style-extraction encoder may be trained to reduce (e.g., minimize) these differences. By reducing these differences, the style-extraction encoder may be trained to more effectively extract style independently of content. This process may be repeated for each pair of training samples that are used to train the style-extraction encoder.

In the second training phase, the content-extraction encoder may be trained using pairs of training samples. Each training sample pair may include a respective first training sample and a respective second training sample that include identical verbal content but that are spoken with different speaking styles. For example, in some cases, the first training sample and the second training sample may be obtained by having different people speak the same words. In other examples, the first training sample and the second training sample may be obtained through data augmentation, such as by using computer-implemented techniques to create the second training sample by modifying one or more speaking style characteristics (e.g., pitch, tone, etc.) of the first training sample. First training data (e.g., a mel spectrogram) representing the first training sample may be provided to the content-extraction encoder, which may encode the first training data to form content-extracted training data that represents the verbal content of the first training sample independently of the speaking style of the first training sample. The content-extracted training data may then be decoded to form reconstructed first training data (e.g., a mel spectrogram) that represents the verbal content of the first training sample independently of the speaking style of the first training sample. The reconstructed first training data may then be compared to second training data, which may be a representation (e.g., mel spectrogram) of the second training sample. Differences between the reconstructed first training data and the second training data may be determined, and the content-extraction encoder may be trained to reduce (e.g., minimize) these differences. By reducing these differences, the content-extraction encoder may be trained to more effectively extract verbal content independently of speaking style. This process may be repeated for each pair of training samples that are used to train the content-extraction encoder.

In the third training phase, the specialized decoder may be trained using a plurality of training samples. For each training sample, training data (e.g., a mel spectrogram) representing the training sample may be provided to both the style-extraction encoder and the content-extraction encoder. The style-extraction decoder may encode the training data to form style-extracted training data that represents the speaking style of the training sample independently of the verbal content of the training sample. The content-extraction decoder may encode the training data to form content-extracted training data that represents the verbal content of the training sample independently of the speaking style of the training sample. The decoder may then decode the style-extracted training data and the content-extracted training data to form reconstructed training data (e.g., a mel spectrogram) that represents the verbal content of the training sample and the speaking style of the training sample. The reconstructed training data may then be compared to the original training data. Differences between the reconstructed training data and the original training data may be determined, and the decoder may be trained to reduce (e.g., minimize) these differences. By reducing these differences, the decoder may be trained to more effectively combine and decode extracted verbal content and extracted speaking style. This process may be repeated for each training sample that is used to train the specialized decoder.

FIG. 1 is a diagram illustrating an example speaking style transfer system that may be used in accordance with the present disclosure. The system of FIG. 1 may be used to generate an output audio sample 143 based on a first input audio sample 101 and a second input audio sample 102. The first input audio sample includes Content A and Style A. Content A is verbal content and Style A is a speaking style. As described above, in one specific example, the first input audio sample 101 may be created as a translation of a portion of an audio soundtrack of a movie with a corresponding video track. The movie may be originally made in the English language and may include a famous English-speaking actor with a distinct and well-known speaking style. The first input audio sample 101 may include a translation, from English to French, of words that are spoken by the famous actor in the movie. The first input audio sample 101 may include French words that are spoken by a French-speaking voice, such as a human voice of a French-speaking human translator or a machine-generated voice of an English-to-French machine translator. Thus, while the first input audio sample 101 may include an accurate translation of words spoken by the famous actor, the first input audio sample 101 may not capture the actor's speaking style, such as the actor's pitch, tone, volume, intonation and prosody.

The output audio sample 143 and the first input audio sample 101 both include the same verbal content (i.e., Content A). However, while the input audio sample 101 has Style A, the output audio sample 143 includes a different speaking style (i.e., Style B), such as the speaking style of the famous actor that originally spoke the words in English. Thus, in some examples, the output audio sample 143 may include a French translation of the actor's original English words, and the output audio sample 143 may also have the same speaking style as the actor. In some examples, the output audio sample 143 may be included in a French soundtrack for the movie. The ability to capture the actor's speaking style in the French translation may cause the French translation to appear more natural and realistic to movie viewers, particularly in cases when the viewers are familiar with the actor's speaking style.

As shown in FIG. 1, in order to generate the output audio sample 143, a second input audio sample 102 is provided. The second input audio sample 102 includes Content B, which is spoken in Style B. For example, the second input audio sample 102 may include a sample of words that are spoken by the famous movie actor. As shown in FIG. 1, the style transfer process may be performed using a content-extraction encoder 121, a style-extraction encoder 122, and a decoder 140. The content-extraction encoder 121 may be trained to extract representations of verbal content from audio data independently of the speaking style of the audio data. By contrast, the style-extraction encoder 122 may be trained to extract representations of speaking style from audio data independently of verbal content of the audio data. Additionally, the decoder 140 may be trained to combine and decode extracted verbal content data and extracted speaking style data into an output representation of speech.

In the example of FIG. 1, first input data 111 representing the first input audio sample 101 is generated during preprocessing 103, which may include performing a Short-time Fourier transform (STFT) or other Fourier-related transform or time-to-frequency transform on the first input audio sample 101. The first input data 111 may be a frequency-domain representation of first input audio sample 101 that indicates amplitudes of frequencies over time, such as a mel spectrogram. In some examples, a mel spectrogram may be particularly advantageous because it may employ a mel frequency scale, which may more closely approximate the human auditory response than a linear frequency scale. The first input data 111 may then be provided to the content-extraction encoder 121, which may encode the first input data 111 to form content-extracted data 131 that represents Content A independently of the Style A. Additionally, second input data 112 representing the second input audio sample 102 is generated during preprocessing 104, which may include performing a STFT or other Fourier-related transform or time-to-frequency transform on the second input audio sample 102. The second input data 112 may be a frequency-domain representation of second input audio sample 102 that indicates amplitudes of frequencies over time, such as a mel spectrogram. It is noted that there is no requirement that identical operations must be performed during preprocessing 103 (for first input audio sample 101) and preprocessing 104 (for second input audio sample 102) or for other preprocessing operations described herein. For example, different types of transforms and/or other additional data modification operations may optionally be employed if desired. The second input data 112 may then be provided to the style-extraction encoder 122, which may encode the second input data 112 to form style-extracted data 132 that represents Style B independently of Content B. The content-extracted data 131 and the style-extracted data 132 may then be provided to the decoder 140, which may decode the content-extracted data 131 and the style-extracted data 132 to form output data 141 that represents Content A and Style B. The output data 141 may be a frequency-domain representation of Content A and Style B that indicates amplitudes of frequencies over time, such as a mel spectrogram. Postprocessing 142 may then be performed to generate output audio sample 143, which includes Content A and Style B. Postprocessing 142 may include, for example, performing an Inverse STFT or inverse of another Fourier-related transform on the output data 141 to form output audio sample 143.

Figure 2:
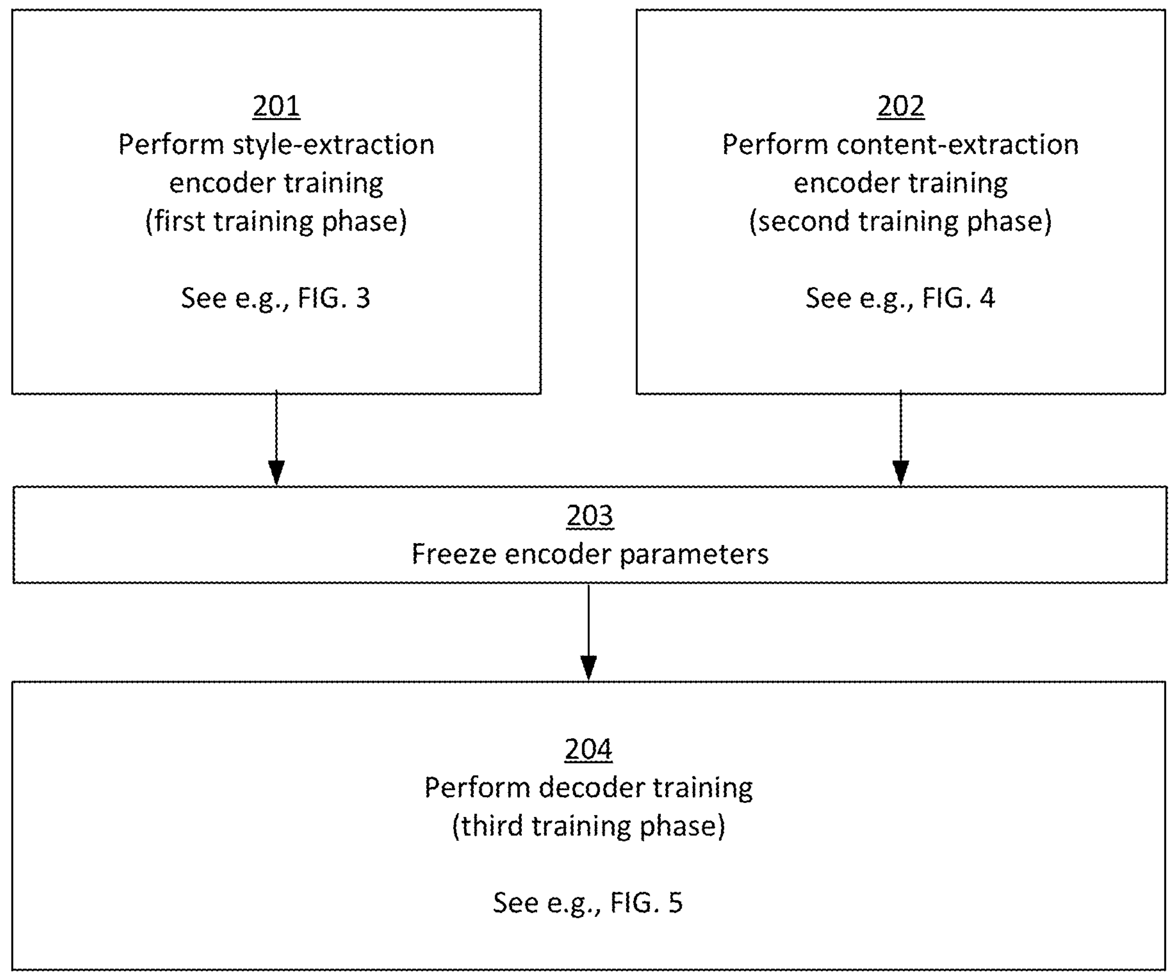
FIG. 2 is diagram illustrating example phases of a training process that may be used in accordance with the present disclosure.

Referring now to FIG. 2, an example process for training of the content-extraction encoder 121, the style-extraction encoder 122, and the decoder 140 will now be described in detail. In the example, of FIG. 2 a three phrase training process is employed. At operation 201, training of the style-extraction encoder 122 is performed as a first training phase. The first training phase is described in detail below with reference to FIG. 3. At operation 202, training of the content-extraction encoder 121 is performed as a second training phase. The second training phase is described in detail below with reference to FIG. 4. In some examples, the first and second training phases may be performed wholly or partially simultaneously with one another or in any order with respect to one another. At operation 203, the encoder parameters for the content-extraction encoder 121 and the style-extraction encoder 122 are frozen, meaning that they are not updated during the training of the decoder 140. The encoding parameters are the encoding instructions that are learned by the content-extraction encoder 121 and the style-extraction encoder 122 during the first and second training phases, respectively, as described in detail below with reference to FIGS. 3 and 4. At operation 204, training of the decoder 140 is performed as a third training phase. The third training phase is described in detail below with reference to FIG. 5. The third training phase may be performed after completion of both the first and the second training phases. Performing of decoder training after encoder training may allow encoding parameters for the content-extraction encoder 121 and the style-extraction encoder 122 and their connections to the decoder to be frozen (i.e., not updated) during the decoder training. This helps to prevent unlearning of weights for the style-extraction encoding and the content-extraction encoding, so that the separation of content and style are not lost.

Figure 3:
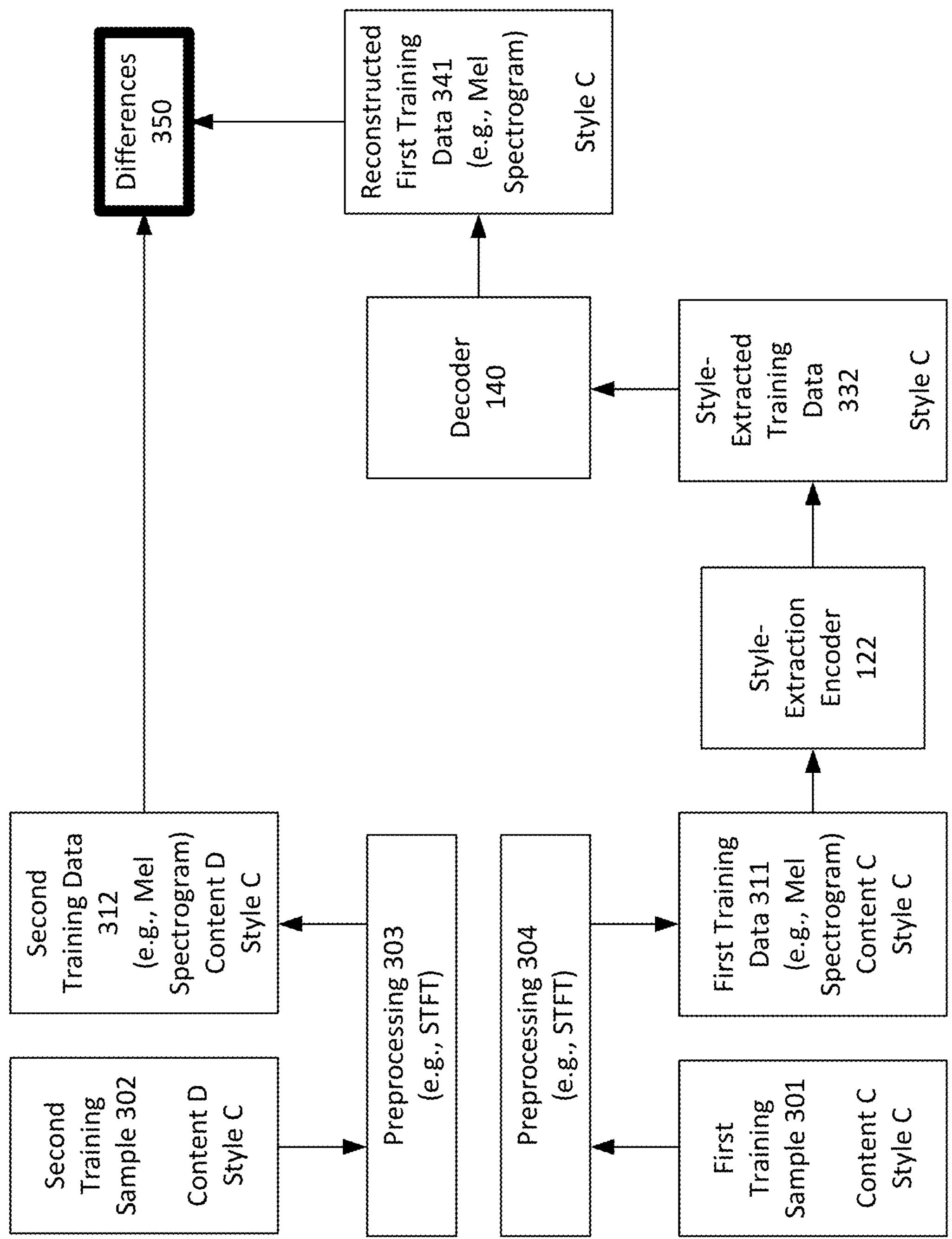
FIG. 3 is a diagram illustrating an example style-extraction encoder training system that may be used in accordance with the present disclosure.

Referring now to FIG. 3, an example system for training of the style-extraction encoder 122 will now be described in detail. In the example of FIG. 3, the style-extraction encoder 122 is trained using a first pair of training samples including first training sample 301 and second training sample 302. The first training sample 301 and second training sample 302 include different verbal content but are spoken with an identical speaking style. Specifically, in this example, the first training sample 301 is an audio sample that includes Content C and Style C, while the second training sample 302 is an audio sample that includes Content D and Style C. For example, in some cases, the first training sample 301 and the second training sample 302 may include different time segments of speech from the same speaker. First training data 311 representing the first training sample 301 is generated during preprocessing 304, which may include performing a STFT or other Fourier-related transform or time-to-frequency transform on the first training sample 301. The first training data 311 may be a frequency-domain representation of first training sample 301 that indicates amplitudes of frequencies over time, such as a mel spectrogram. Additionally, second training data 312 representing the second training sample 302 is generated during preprocessing 303, which may include performing a STFT or other Fourier-related transform or time-to-frequency transform on the second training sample 302. The second training data 312 may be a frequency-domain representation of second training sample 302 that indicates amplitudes of frequencies over time, such as a mel spectrogram.

The first training data 311 may be provided to the style-extraction encoder 122, which may encode the first training data 311 to form style-extracted training data 332 that represents the speaking style (Style C) of the first training sample 301 independently of the verbal content (Content C) of the first training sample 301. The style-extracted training data 332 may then be decoded by decoder 140 to form reconstructed first training data 341 that represents the speaking style (Style C) of the first training sample 301 independently of the verbal content (Content C) of the first training sample 301. The reconstructed first training data 341 may be a frequency-domain representation of Content C that indicates amplitudes of frequencies over time, such as a mel spectrogram. The reconstructed first training data 341 may then be compared to second training data 312 to determine differences 350 between the reconstructed first training data 341 and the second training data 312. The style-extraction encoder 122 may be trained to reduce (e.g., minimize) the differences 350 between the reconstructed first training data 341 and the second training data 312. By reducing the differences 350, the style-extraction encoder 122 may be trained to more effectively extract style independently of content.

As described above, the second training data 312 may be a representation of Content D and Style C from the second training sample 302. By contrast, the reconstructed first training data 341 may be a representation of Style C independent of Content C from the first training sample 301. Thus, the content of the second training data 312 (i.e., Content D) will not match the reconstructed first training data 341, which is merely a representation of style independent of content. However, it is noted that the style-extraction encoder 122 is trained for purposes of extracting style as opposed to content. Thus, during training of the style-extraction encoder 122, the content of the second training data 312 (i.e., Content D) is merely treated as noise, and there is therefore no requirement that the reconstructed first training data 341 must match the content of the second training data 312 (i.e., Content D).

In some examples, the system shown in FIG. 3 may employ a neural network model, in which an error is computed using a loss function (e.g., differences between predicted and actual data) for each data instance and propagated back through the neural network. In the back propagation step, the learnable parameters/weights may be updated, such as by computing a gradient/slope of a loss function with respect to weights of the network and using the gradient/slope to update the weights to minimize error. For example, for a plot with error in a y-axis and weight values in an x-axis, the minimized error may correspond to the x-axis point (weight) that corresponds to the minimum point of the graph/error. The gradient (slope) computed at each point may provide a direction for updating of the weight to minimize error. Thus, in some examples, in order to reduce (e.g., minimize) the differences 350 between the reconstructed first training data 341 and the second training data 312, the style-extraction encoder 122 may perform multiple iterations of encoding the first training data 311 to form multiple iterations of the style-extracted training data 332 (each using at least partially different encoding parameters) and, in turn, multiple iterations of the reconstructed first training data 341. Each iteration of the reconstructed first training data 341 may be compared to the second training data 312 to determine a respective iteration of the differences 350. Each iteration of the differences 350 may then be propagated back through the neural network to reduce the error, such as by using the gradient/slope to find encoding parameters that produce a minimum error. In some examples, the process described above, and shown in FIG. 3, may be repeated for any number of other pairs of training samples (each including training samples with the same style but different verbal content) that may be used to train the style-extraction encoder 122.

Figure 4:
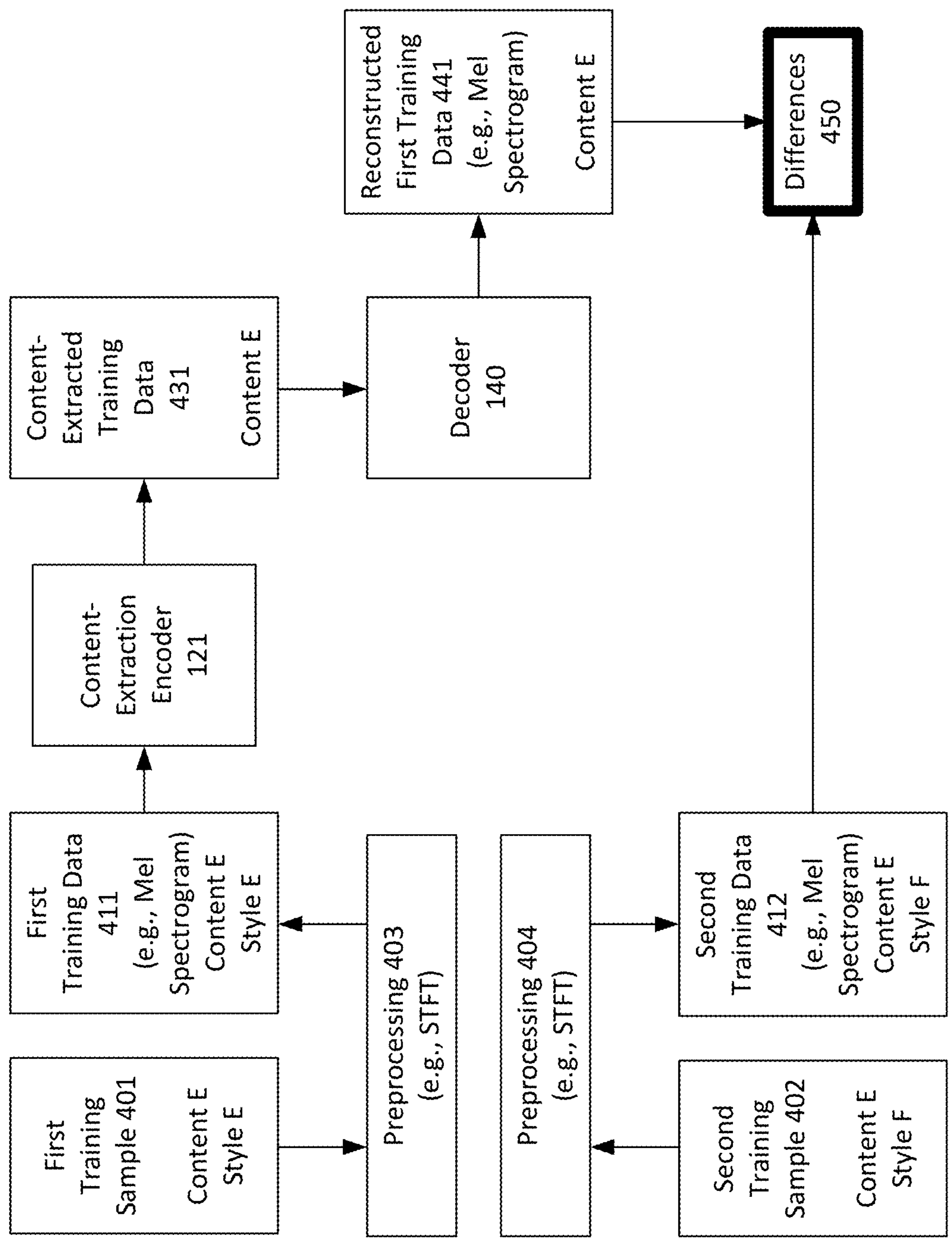
FIG. 4 is a diagram illustrating an example content-extraction encoder training system that may be used in accordance with the present disclosure.

Referring now to FIG. 4, an example system for training of the content-extraction encoder 121 will now be described in detail. In the example of FIG. 4, the content-extraction encoder 121 is trained using a first pair of training samples including first training sample 401 and second training sample 402. The first training sample 401 and second training sample 402 include identical verbal content but are spoken with different speaking styles. Specifically, in this example, the first training sample 401 is an audio sample that includes Content E and Style E, while the second training sample 402 is an audio sample that includes Content E and Style F. For example, in some cases, the first training sample 401 and the second training sample 402 may be obtained by having different people speak the same words. In other examples, the first training sample 401 and the second training sample 402 may be obtained through data augmentation, such as by using computer-implemented techniques to create the second training sample 402 by modifying one or more speaking style characteristics (e.g., pitch, tone, etc.) of the first training sample 401. First training data 411 representing the first training sample 401 is generated during preprocessing 403, which may include performing a STFT or other Fourier-related transform or time-to-frequency transform on the first training sample 401. The first training data 411 may be a frequency-domain representation of first training sample 401 that indicates amplitudes of frequencies over time, such as a mel spectrogram. Additionally, second training data 412 representing the second training sample 402 is generated during preprocessing 404, which may include performing a STFT or other Fourier-related transform or time-to-frequency transform on the second training sample 402. The second training data 412 may be a frequency-domain representation of second training sample 402 that indicates amplitudes of frequencies over time, such as a mel spectrogram.

The first training data 411 may be provided to the content-extraction encoder 121, which may encode the first training data 411 to form content-extracted training data 431 that represents the verbal content (Content E) of the first training sample 401 independently of the style (Style E) of the first training sample 401. The content-extracted training data 431 may then be decoded by decoder 140 to form reconstructed first training data 441 that represents the verbal content (Content E) of the first training sample 401 independently of the style (Style E) of the first training sample 401. The reconstructed first training data 441 may be a frequency-domain representation of Content E that indicates amplitudes of frequencies over time, such as a mel spectrogram. The reconstructed first training data 441 may then be compared to second training data 412 to determine differences 450 between the reconstructed first training data 441 and the second training data 412. The content-extraction encoder 121 may be trained to reduce (e.g., minimize) the differences 450 between the reconstructed first training data 441 and the second training data 412. By reducing the differences 450, the content-extraction encoder 121 may be trained to more effectively extract verbal content independently of style.

As described above, the second training data 412 may be a representation of Content E and Style F from the second training sample 402. By contrast, the reconstructed first training data 441 may be a representation of Content E independent of Style E from the first training sample 401. Thus, the style of the second training data 412 (i.e., Style F) will not match the reconstructed first training data 441, which is merely a representation of content independent of style. However, it is noted that the content-extraction encoder 121 is trained for purposes of extracting content as opposed to style. Thus, during training of the content-extraction encoder 121, the style of the second training data 412 (i.e., Style F) is merely treated as noise, and there is therefore no requirement that the reconstructed first training data 441 must match the style of the second training data 412 (i.e., Style F).

In some examples, the system shown in FIG. 4 may employ a neural network model, in which an error is computed using a loss function (e.g., differences between predicted and actual data) for each data instance and propagated back through the neural network. In the back propagation step, the learnable parameters/weights may be updated, such as by computing a gradient/slope of a loss function with respect to weights of the network and using the gradient/slope to update the weights to minimize error. For example, for a plot with error in a y-axis and weight values in an x-axis, the minimized error may correspond to the x-axis point (weight) that corresponds to the minimum point of the graph/error. The gradient (slope) computed at each point may provide a direction for updating of the weight to minimize error. Thus, in some examples, in order to reduce (e.g., minimize) the differences 450 between the reconstructed first training data 441 and the second training data 412, the content-extraction encoder 121 may perform multiple iterations of encoding the first training data 411 to form multiple iterations of the content-extracted training data 431 (each using at least partially different encoding parameters) and, in turn, multiple iterations of the reconstructed first training data 441. Each iteration of the reconstructed first training data 441 may be compared to the second training data 412 to determine a respective iteration of the differences 450. Each iteration of the differences 450 may then be propagated back through the neural network to reduce the error, such as by using the gradient/slope to find encoding parameters that produce a minimum error. In some examples, the process described above, and shown in FIG. 4, may be repeated for any number of other pairs of training samples (each including training samples with the same verbal content but different styles) that may be used to train the content-extraction encoder 121.

Figure 5:
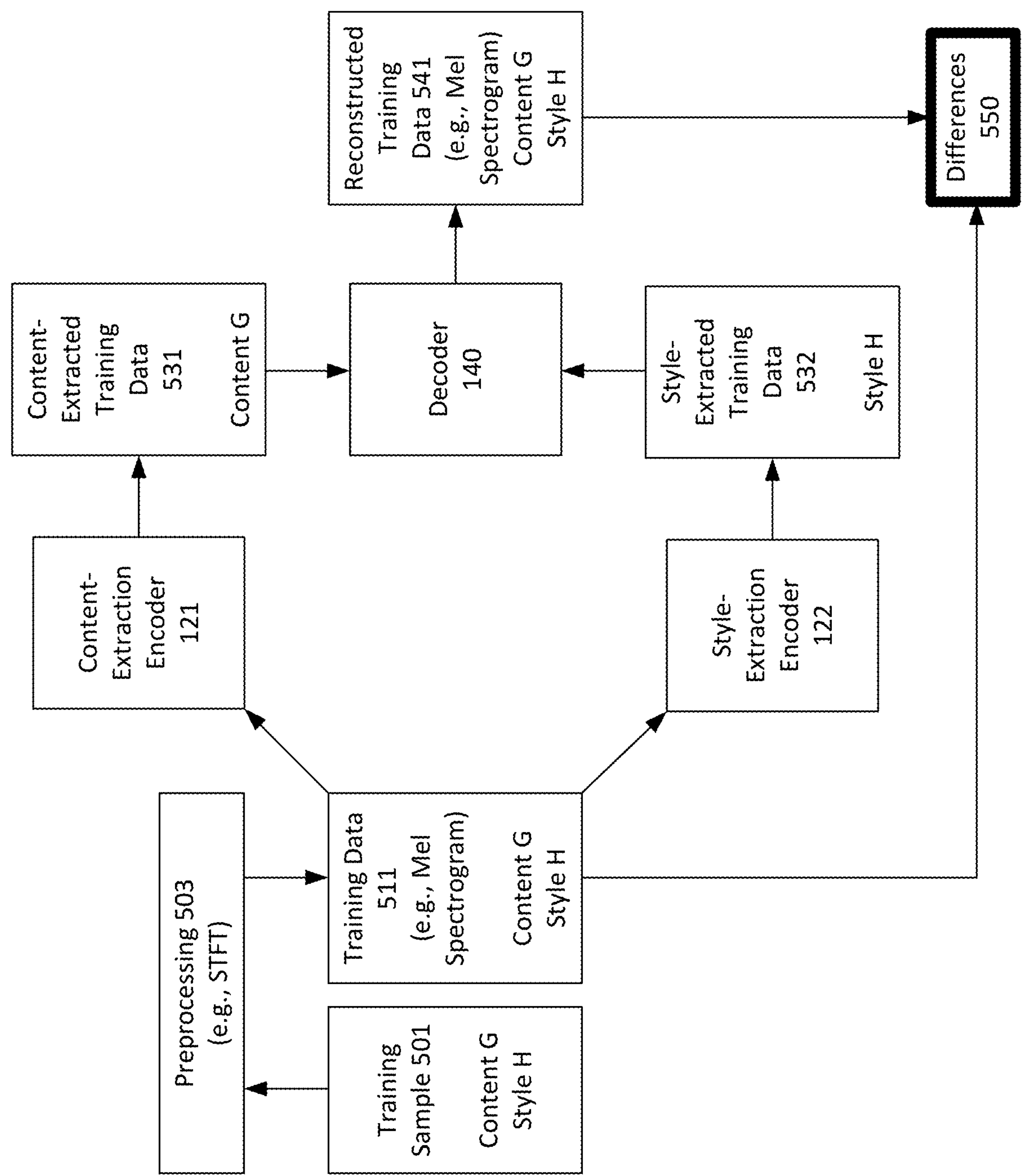
FIG. 5 is a diagram illustrating example decoder training system that may be used in accordance with the present disclosure.

Referring now to FIG. 5, an example system for training of the decoder 140 will now be described in detail. In the example of FIG. 5, the decoder 140 is trained using a training sample 501, which is an audio sample that includes Content G and Style H. Training data 511 representing the training sample 501 is generated during preprocessing 503, which may include performing a STFT or other Fourier-related transform or time-to-frequency transform on the training sample 501. The training data 511 may be a frequency-domain representation of training sample 501 that indicates amplitudes of frequencies over time, such as a mel spectrogram. The training data 511 is provided to both content-extraction encoder 121 and style-extraction encoder 122. The style-extraction encoder 122 encodes the training data 511 to form style-extracted training data 532 that represents the speaking style (Style H) of the training sample 501 independently of the verbal content (Content G) of the training sample 501. The content-extraction encoder 121 encodes the training data 511 to form content-extracted training data 531 that represents the verbal content (Content G) of the training sample 501 independently of the speaking style (Style H) of the training sample 501. The decoder 140 may then decode the style-extracted training data 532 and the content-extracted training data 531 to form reconstructed training data 541 that represents the verbal content (Content G) of the training sample 501 and the speaking style (Style H) of the training sample 501. The reconstructed training data 541 may be a frequency-domain representation of Content G and Style H that indicates amplitudes of frequencies over time, such as a mel spectrogram. The reconstructed training data 541 may be compared to the training data 511. Differences 550 between the reconstructed training data 541 and the training data 511 may be determined, and the decoder may be trained to reduce (e.g., minimize) the differences 550. By reducing the differences 550, the decoder 140 may be trained to more effectively combine and decode extracted verbal content and extracted speaking style.

In some examples, the system shown in FIG. 5 may employ a neural network model, in which an error is computed using a loss function (e.g., differences between predicted and actual data) for each data instance and propagated back through the neural network. In the back propagation step, the learnable parameters/weights may be updated, such as by computing a gradient/slope of a loss function with respect to weights of the network and using the gradient/slope to update the weights to minimize error. For example, for a plot with error in a y-axis and weight values in an x-axis, the minimized error may correspond to the x-axis point (weight) that corresponds to the minimum point of the graph/error. The gradient (slope) computed at each point may provide a direction for updating of the weight to minimize error. Thus, in some examples, in order to reduce (e.g., minimize) the differences 550 between the reconstructed training data 541 and the training data 511, the decoder 140 may perform multiple iterations of decoding the content-extracted training data 531 and the style-extracted training data 532 to form multiple iterations of the reconstructed training data 541 (each using at least partially different decoding parameters). Each iteration of the reconstructed training data 541 may be compared to the training data 511 to determine a respective iteration of the differences 550. Each iteration of the differences 550 may then be propagated back through the neural network to reduce the error, such as by using the gradient/slope to find encoding parameters that produce a minimum error. In some examples, the process described above, and shown in FIG. 5, may be repeated for any number of other training samples that may be used to train the decoder 140.

It is noted that the techniques described herein may be employed for both manual dubbing and automatic text-to-speech. For example, in some cases, manual dubbing may be employed to create the first input audio sample 101 of FIG. 1. After the manual dubbing is complete, the techniques described herein may replace the style of the speaker/translator in the manual dubbing with the style of the original speaker (e.g., from the second input audio sample 102). In the automatic text-to-speech approach, some automatic text-to-speech tools may be trained on data belonging to voice artists and, therefore, may generate output speech only in a few voices that correspond to the voice artists. In some cases, output from a text-to-speech tool may be used as the first input audio sample 101 of FIG. 1. The techniques described herein may replace the style of the text-to-speech output with the desired style (e.g., from the second input audio sample 102). In some examples, an encoder and decoder system, such as shown in FIG. 1 and described above, may be provided as a module in the text-to-speech toolset so that the generated speech preserves the style of the original speaker.

Figure 6:
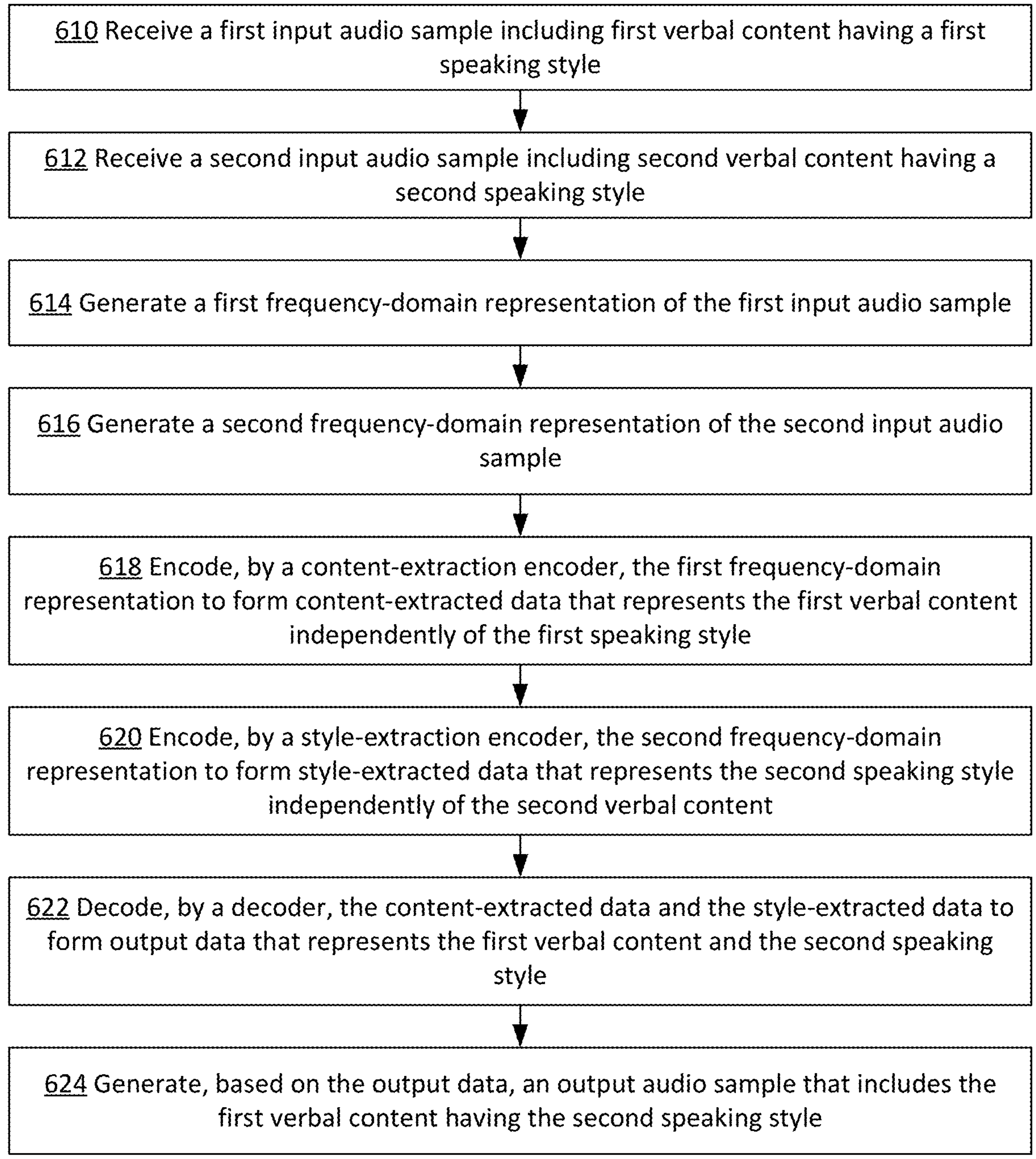
FIG. 6 is a flowchart illustrating an example speaking style transfer process that may be used in accordance with the present disclosure.

FIG. 6 is a flowchart illustrating an example speaking style transfer process that may be used in accordance with the present disclosure. In some examples, the training process of FIG. 3 may be performed prior to the style transfer process of FIG. 6, such that the style-extraction encoder, the content-extraction encoder and the decoder are trained for performance of the style transfer process of FIG. 6. The process of FIG. 6 is initiated at operation 610, at which a first input audio sample is received. The first input audio sample includes first verbal content having a first speaking style. For example, as shown in FIG. 1, first input audio sample 101 includes Content A and Style A. The first input audio sample may be received by one or more preprocessing components that perform preprocessing 103 of FIG. 1. At operation 612, at which a second input audio sample is received. The second input audio sample includes second verbal content having a second speaking style. For example, as shown in FIG. 1, second input audio sample 102 includes Content B and Style B. The second input audio sample may be received by one or more preprocessing components that perform preprocessing 104 of FIG. 1. As described above, in some examples, the first input audio sample may be a translation of speech that is spoken by a person having the second speaking style, such as from one spoken language (e.g., English) to another spoken language (e.g., French). Also, in some examples, the first input audio sample may be generated manually, such as by a human translator, or generated automatically, such as via a text-to-speech tool.

At operation 614, a first frequency-domain representation (e.g., first input data 111 of FIG. 1) of the first input audio sample is generated. For example, as described above, first input data 111 representing the first input audio sample 101 may be generated during preprocessing 103, which may include performing an STFT or other Fourier-related transform or time-to-frequency transform on the first input audio sample 101. The first input data 111 may be a frequency-domain representation of first input audio sample 101 that indicates amplitudes of frequencies over time, such as a mel spectrogram. In some examples, a mel spectrogram may be particularly advantageous because it may employ a mel frequency scale, which may more closely approximate the human auditory response than a linear frequency scale. At operation 616, a second frequency-domain representation (e.g., second input data 112 of FIG. 1) of the second input audio sample is generated. For example, as described above, second input data 112 representing the second input audio sample 102 may be generated during preprocessing 104, which may include performing an STFT or other Fourier-related transform or time-to-frequency transform on the second input audio sample 102. The second input data 112 may be a frequency-domain representation of second input audio sample 102 that indicates amplitudes of frequencies over time, such as a mel spectrogram.

At operation 618, the first frequency-domain representation is encoded, by a content-extraction encoder, to form content-extracted data that represents the first verbal content independently of the first speaking style. Operation 618 may include identifying data within the first frequency-domain representation that correlates to and/or indicates words or sounds that are included in the first input audio sample but that does correlate to and/or indicate the first speaking style. The identified data may then be extracted to form the content-extracted data. For example, suppose that first input audio sample included the French word "bonjour" spoken with characteristics of the first speaking style (e.g., pitch, tone, volume, intonation and/or prosody). In this example, the content-extracted data may include a representation of the word "bonjour" without reflecting the style characteristics such as pitch, tone, volume, intonation and/or prosody with which the word was spoken. As described above, a content extraction encoder is an encoder that is trained to extract representations of verbal content from audio data independently of the speaking style of the audio data. As also described above, the content-extraction encoder may be trained based at least in part on a first training sample (e.g., first training sample 401 of FIG. 4) and a second training sample (e.g., second training sample 402 of FIG. 4) that include matching verbal content (e.g., Content E) and have different respective speaking styles (e.g., Style E and Style F, respectively). In some examples, the second training sample may be formed by modifying one or more speaking style characteristics of the first training sample. The training of the content-extraction encoder may include reducing (e.g., minimizing) differences (e.g., differences 450) between a reconstruction (e.g., reconstructed first training data 441) of first data (e.g., first training data 411) representing the first training sample and second data (e.g., second training data 412) representing the second training sample.

At operation 620, the second frequency-domain representation is encoded, by a style-extraction encoder, to form style-extracted data that represents the second speaking style independently of the second verbal content. Operation 620 may include identifying data within the second frequency-domain representation that correlates to and/or indicates the second speaking style but that does correlate to and/or indicate words or sounds that are included in the second input audio sample. The identified data may then be extracted to form the style-extracted data. For example, suppose that the second input audio sample included the English word "hello" spoken with characteristics of the second speaking style (e.g., pitch, tone, volume, intonation and/or prosody). In this example, the style-extracted data may reflect the style characteristics such as pitch, tone, volume, intonation and/or prosody without including data indicating that the word "hello" was spoken. As described above, a style extraction encoder is an encoder that is trained to extract representations of speaking style from audio data independently of the verbal content of the audio data. As also described above, the style-extraction encoder may be trained based at least in part on a first training sample (e.g., first training sample 301 of FIG. 3) and a second training sample (e.g., second training sample 302 of FIG. 3) that include matching speaking styles (e.g., Style C) and have different respective verbal content (e.g., Content C and Content D, respectively). The training of the style-extraction encoder may include reducing (e.g., minimizing) differences (e.g., differences 350) between a reconstruction (e.g., reconstructed first training data 341) of first data (e.g., first training data 311) representing the first training sample and second data (e.g., second training data 312) representing the second training sample.

At operation 622, a decoder decodes the content-extracted data and the style-extracted data to form output data (e.g., output data 141 of FIG. 1) that represents the first verbal content and the second speaking style. Operation 622 may include combining data representing the first verbal content (included in the content-extracted data) with data representing the second speaking style (included in the style-extracted data) to form a frequency-domain representation in which the second speaking style is applied to the first verbal content. For example, if the first verbal content included the French word "bonjour", the decoder may combine the content-extracted data and the style-extracted data such that the French word "bonjour" is spoken with the characteristics of the second speaking style (e.g., pitch, tone, volume, intonation and/or prosody). As described above, the decoder may be trained based at least in part on content-extracted training data (e.g., content-extracted training data 531 of FIG. 5) and style-extracted training data (e.g., style-extracted training data 532 of FIG. 5) that are both extracted from training data (e.g., training data 511 of FIG. 5). The decoder may decode the content-extracted training data and the style-extracted training data to form reconstructed training data (e.g., reconstructed training data 541 of FIG. 5). Training of the decoder may include reducing differences (e.g., differences 550) between the reconstructed training data and the training data.

At operation 624, an output audio sample (e.g., output audio sample 143 of FIG. 1) is generated based on the output data. The output audio sample includes the first verbal content having the second speaking style. As described above, postprocessing 142 of FIG. 1 may be performed to generate output audio sample 143, which includes Content A and Style B. Postprocessing 142 may include, for example, performing an Inverse STFT or inverse of another Fourier-related transform on the output data 141 to form output audio sample 143.

It is noted that, while some of the above-described examples relate to scenarios in which audio is translated from one language to another (e.g., from English to French), the techniques described herein may also be employed in scenarios in which no translation is performed (i.e., single-language scenarios). There are many scenarios in which it may be desirable to modify the speaking style of an audio sample even when the audio sample is not generated as a result of a translation.

It is also noted that, while some of the above-described examples relate to scenarios in which spoken/verbal content is transferred from one speaking style to another, the techniques described herein may also be employed in scenarios in which other types of audio content (e.g., musical content, sirens, alarms, audio notifications, hybrid musical-spoken content, etc.) are transferred from one audio style to another. For example, the techniques described herein may be employed to change a musical style of a musical composition from one musical style (e.g., Style A) to another style (e.g., Style B). This may include modifying musical style characteristics (e.g., pitch, tone, volume, beat, rhythm, tempo, time duration of sounds, repetition intervals of sounds, etc.) of a musical composition. As an example, a process may include generating a first frequency-domain representation of a first input audio sample, the first input audio sample including first musical content having a first musical style; generating a second frequency-domain representation of a second input audio sample, the second input audio sample including second musical content having a second musical style; encoding, by a content-extraction encoder, the first frequency-domain representation to form content-extracted data that represents the first musical content independently of the first musical style; encoding, by a style-extraction encoder, the second frequency-domain representation to form style-extracted data that represents the second musical style independently of the second musical content; decoding, by a decoder, the content-extracted data and the style-extracted data to form output data that represents the first musical content and the second musical style; and generating, based on the output data, an output audio sample that includes the first musical content having the second musical style.

Facial Feature-Based Audio Frame Replacement

Techniques for facial feature location-based audio frame replacement are also described herein. The techniques may be employed in a system in which video data and corresponding audio data are transmitted over a network, such as an audio-video conferencing system. The term audio-video conferencing, as used herein, refers to a conferencing system in which both audio and video of conference participants are transmitted over a network. In some examples, video of a person, such as depicting the person's face, may be captured by a camera and transmitted over a network to one or more receiving devices. The video may depict the person's head movements, lip movements, facial expressions, and the like. Additionally, corresponding audio may be captured by a microphone and transmitted over a network to the one or more receiving devices. The audio may include words and other sounds spoken by the person. In some examples, multiple users may participate in an audio-video conference, and each participant may receive audio and video from each other participant. Also, in some examples, the received video and audio data may be played live. This may allow conference participates to listen and respond to each other in real-time (or near-real-time), such as to more closely simulate a face-to-face conversation or meeting.

According to the techniques described herein, an object recognition analysis may be performed on the video of a person's face. In some examples, the object recognition analysis may be performed locally at the person's computer. The object recognition analysis may be employed to generate location data by tracking locations of facial features of the person's face in frames of the transmitted video data. In some examples, these facial features may include various key points, which are points on the person's face, such as around the outer edges of the face, along the user's lips (e.g., points along upper lip, points along lower lip, points at intersections of lips, etc.), eyes, eyebrows, nose, ears, hairline, cheeks, chin, forehead, and other locations. In some examples, a respective data set of location data may be generated for each audio frame of the audio content and/or video frame of the video content. Each data set of the location data may indicate locations of the facial features in the respective frame, such as two dimensional (e.g., X and Y) coordinate values for each facial feature in the respective frame. This location data may be transmitted along with the corresponding video data and audio data to one or more receiving devices.

In some examples, on a receiving device, a monitoring component may execute to determine one or more replaced frames of the transmitted audio. The term audio frame, as used herein, refers to a portion of audio content. In some examples, an audio frame may have a duration that is equal to a frame rate of the corresponding video content. The replaced frames are frames of the audio content that are not played at the receiving device. In some examples, the replaced frames may include lost frames that are not received by the receiving device (or are received out of order or too late) and frames that are received with poor quality, such as with high amounts of errors or missing or distorted data. In some examples, a temporary reduction in bandwidth may result in one or more lost audio frames and/or poor quality frames, which may be determined to be replaced frames. Additionally or alternatively, one or more lost and/or poor quality frames may be caused by scenarios in which one or more new participants join an audio-video conference, thereby resulting in additional audio and video streams and higher amounts of transmitted and received data. In some examples, the monitoring component may determine replaced frames through various techniques, such as by estimating the incoming bandwidth, based on the amount of incoming data (e.g., quantity of conference participants, etc.), by checking the sequence of incoming audio frames (e.g., to determine lost or missing frames), and/or by determining the quality of incoming audio frames using one or more quality metrics.

The techniques described herein may allow the replaced audio frames to be replaced with replacement audio frames that are generated at the receiving device. Specifically, in some examples, a replacement audio frame may be generated based at least in part on the respective location data for the corresponding replaced audio frame. For example, in some cases, audio output that approximates a portion of the person's speech corresponding to the replaced audio frame may be determined based, at least in part, on the locations indicated by the location data. In some examples, at least one sound spoken by the person may be determined based on the locations indicated by the location data. For example, the locations indicated by the location data may include lip positions of lips of the person in a video frame. The at least one sound spoken by the person may then be determined based at least in part on the lip positions. In some examples, output from a machine learning model may indicate a correlation between the at least one sound and the lip positions. For example, the machine learning model may generate model data that indicates correlations between different lip positions and different sounds. In some cases, for given sets and/or ranges of lip positions, the model data may indicate respective sounds that correlate to the sets and/or ranges of lip positions.

In some examples, the audio output that approximates a portion of the person's speech may also be determined based on a speaking style of the person, thereby enabling the audio output to match the person's speaking style. For example, in some cases, once the at least one sound is determined based on the location data, the at least one sound may then be conditioned based on speaking style data that corresponds to a speaking style of the person. In some examples, the at least one sound may be represented using a frequency domain (e.g., mel spectrogram) representation, and the frequency domain representation may be modified based on the speaking style data to match the person's speaking style. Also, in some examples, the at least one sound may be a word, portion of a word, and/or a phoneme spoken by the person, and the speaking style data may be applied to the at least one sound to cause the word, portion of a word, and/or a phoneme to be spoken in the person's speaking style. Thus, the at least one sound may be conditioned using the speaking style data to cause the audio output to match the person's speaking style. Additionally, in some examples, the audio output may be smoothed, such as by setting one or more characteristics (e.g., volume, signal strength, etc.) of the audio output to blend with adjacent portions of the audio content, by setting a duration of the audio content to match the duration of the replaced audio content, and/or using other techniques.

Thus, by generating the replacement audio frames based on the location data and speaking style data as described above, the techniques described herein may allow high quality audio depictions of a person's speech to be consistently played to users, even during periods of reduced bandwidth and while audio-video conferencing with large quantities of other participants. Some conventional techniques may attempt to adapt to low bandwidth conditions by reducing audio and/or video quality. By contrast, by the replacement frame generation techniques described herein may allow audio to be played without reductions to quality, and without interrupting the played audio, thereby enhancing the user experience. Because the replacement audio frames may be generated locally at the receiving device, the replacement audio frames may be generated and played with high quality regardless of current bandwidth conditions. Moreover, because the replacement audio frames may be generated based on location data, there is no requirement that video of the speaker must be transmitted to, or received by, the receiving device. Thus, the techniques described herein may be employed to generate replacement audio frames in scenarios when receipt of video of the speaker is temporarily interrupted and/or downgraded in quality, such as due to reduced bandwidth conditions. Moreover, the techniques described herein may also be employed to generate replacement audio frames in scenarios when no video of the speaker is being received at all by receiving device, such as for audio-only conferencing without receipt of corresponding video.

Figure 7:
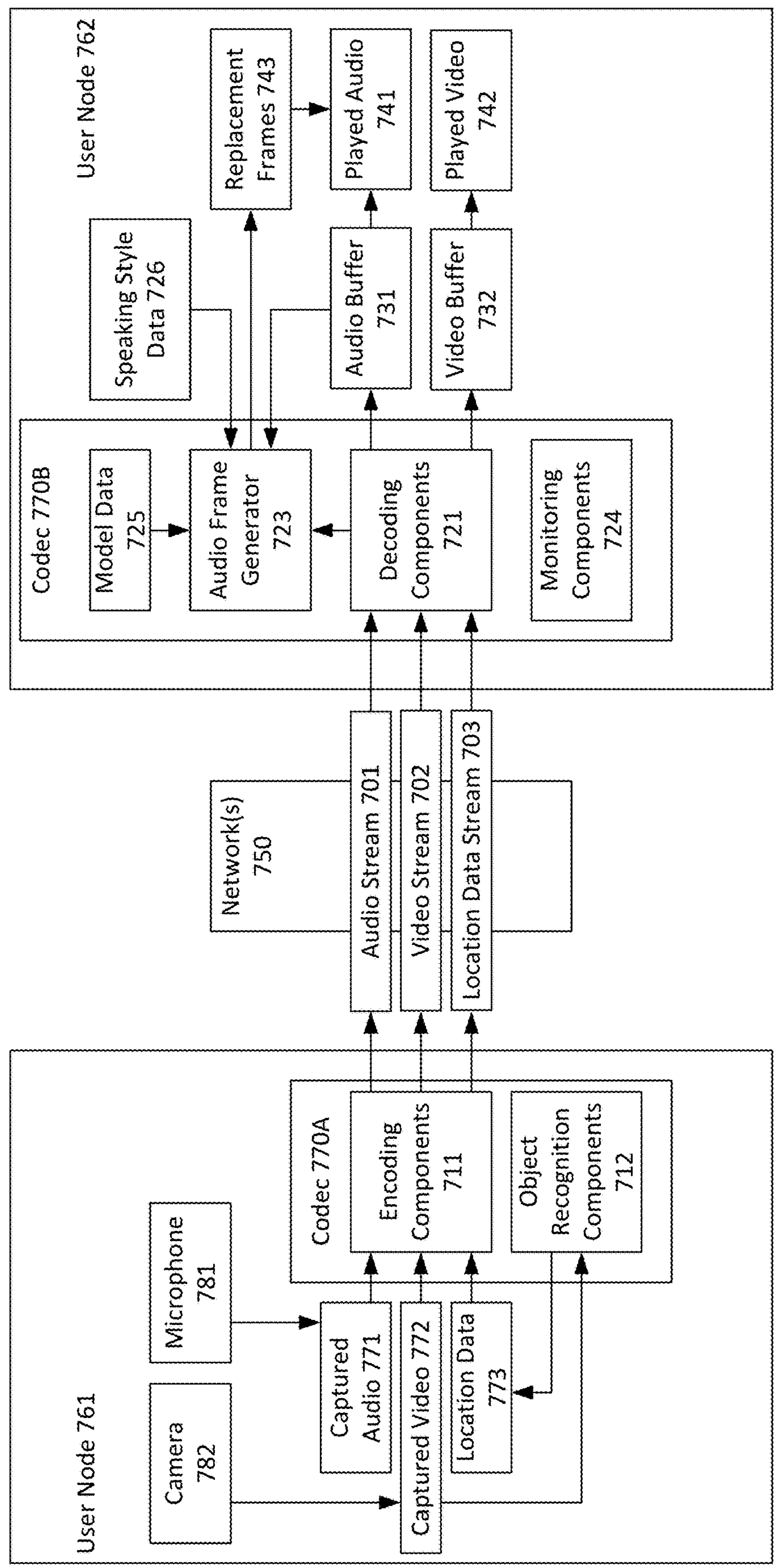
FIG. 7 is a diagram illustrating an example audio frame replacement system that may be used in accordance with the present disclosure.

FIG. 7 is a diagram illustrating an example audio frame replacement system that may be used in accordance with the present disclosure. In the example of FIG. 7. audio frame replacement is performed using codecs 710A and 710B executing on user nodes 761 and 762, respectively. In some examples, codecs 710A and 710B may be separate codecs or may be considered to be components of a single codec. As shown in FIG. 7. user nodes 761 and 762 communicate over one or more network(s) 750. In some examples, user nodes 761 and 762 may each include a respective computing device, such as a desktop, laptop or tablet computer, smartphone, gaming console, set top box, and the like. As also shown in FIG. 7. captured video 772 is captured at user node 761 via a camera 782. The captured video 772 includes video of a person's face and head. The captured video 772 may include the person's head movements, lip movements, facial expressions, and the like. The captured video 772 is optionally encoded by encoding components 711 and optionally transmitted from user node 761 to user node 762 via video stream 702. As described above, there is no requirement that the captured video 772 must be transmitted from user node 761 to user node 762. As also shown in FIG. 7. captured audio 771 is captured at user node 761 via a microphone 781. The captured audio 771 includes audio data that corresponds to the captured video 772. The captured audio 771 may include words and other sounds spoken by the person that is displayed in the captured video 772. The captured audio 771 is encoded by encoding components 711 and transmitted from user node 761 to user node 762 via audio stream 701.

Thus, as described above, user node 762 may receive captured audio 771 and captured video 772 from user node 761 via audio stream 701 and video stream 702, respectively. In some examples, an audio-video conference may be established between user node 761, user node 762 and optionally any number of other user nodes. In these examples, audio and video data may be exchanged between each user node that participates in the audio-video conference. For example, although not shown in FIG. 7. user node 762 may optionally receive audio data and video data of respective users from any number of other user nodes participating in the teleconference, while user node 761 may also receive audio and video data of respective users from user node 762 and other user nodes.

The audio stream 701 and video stream 702 are transmitted over one or more network(s) 750, which may include one or more local area networks (LAN's) and/or one or more wide area networks (WAN's), such as the Internet. The audio stream 701 and video stream 702 may be transmitted using streaming transmission techniques, in which portions of transmitted content are received and played while subsequent portions of the transmitted content are being transmitted. In some examples, the audio stream 701 and video stream 702 may be transmitted using live streaming techniques, in which content of an event (e.g., an audio-video conference) may be transmitted to viewers, and at least part of the content may be played while the event is still occurring (e.g., while the audio-video conference is still occurring), albeit with some small amounts latency between the time that content is captured and the time that the content is eventually played to viewers. For example, for an audio-video conference, the received video and audio data may be played live. This may allow conference participates to listen and respond to each other in real-time (or near-real-time), such as to more closely simulate a face-to-face conversation or meeting.

As shown in FIG. 7. an object recognition analysis may be performed on the captured video 772 by object recognition components 712 at user node 761. The object recognition analysis may be employed to generate location data 773 by tracking locations of facial features of the person's face in frames of the captured video 772. In some examples, these facial features may include various key points, which are points on the person's face, such as around the outer edges of the face, along the user's lips (e.g., points along upper lip, points along lower lip, points at intersections of lips, etc.), eyes, eyebrows, nose, ears, hairline, cheeks, chin, forehead, and other locations. The object recognition analysis may include analyzing an image, such as a video frame, to detect shapes within the image that correspond to human features, such as circular, ovular, elliptical, linear or other shapes that correspond a face, eyes, mouth, nose, etc. For example, feature extraction techniques, such as a Hough transform, may be employed to detect, lines, circles, ellipses and other shapes. In some examples, a respective data set of location data 773 may be generated for each frame of the captured audio 771 and/or captured video 772.

Each data set of location data 773 may indicate locations of the facial features in a respective video frame, such as two dimensional (e.g., X and Y) coordinate values for each facial feature in the respective frame. For example, in some cases, the location data 773 may indicate locations of points on the face. In some examples, in addition or as an alternative to these points, the location data 773 may also include other location-related information, such as information regarding animation parameters, deformation parameters, action units, facial pose data, and other information associated with a shape or structure of the face and/or other objects in an image. This location data 773, including respective data sets for each frame of the captured video 772, may be encoded by encoding components 711 and transmitted to user node 762 over one or more network(s) 750 via location data stream 703. In some examples, the object recognition analysis may be synchronized with the captured audio 771 and the captured video 772, such as by being repeatedly executed at a rate that is equivalent to the frame rate of the captured audio 771 and the captured video 772, thereby allowing a respective data set of the location data 773 to be generated for each frame of the captured audio 771 and the captured video 772. As described above, in some examples, each audio frame in the captured audio 771 may have a duration that is equal to the frame rate of the captured video 772. Thus, in some examples, an audio frame may correspond to a portion of audio that is captured, transmitted and/or received synchronously with a corresponding video frame.

Figure 8:
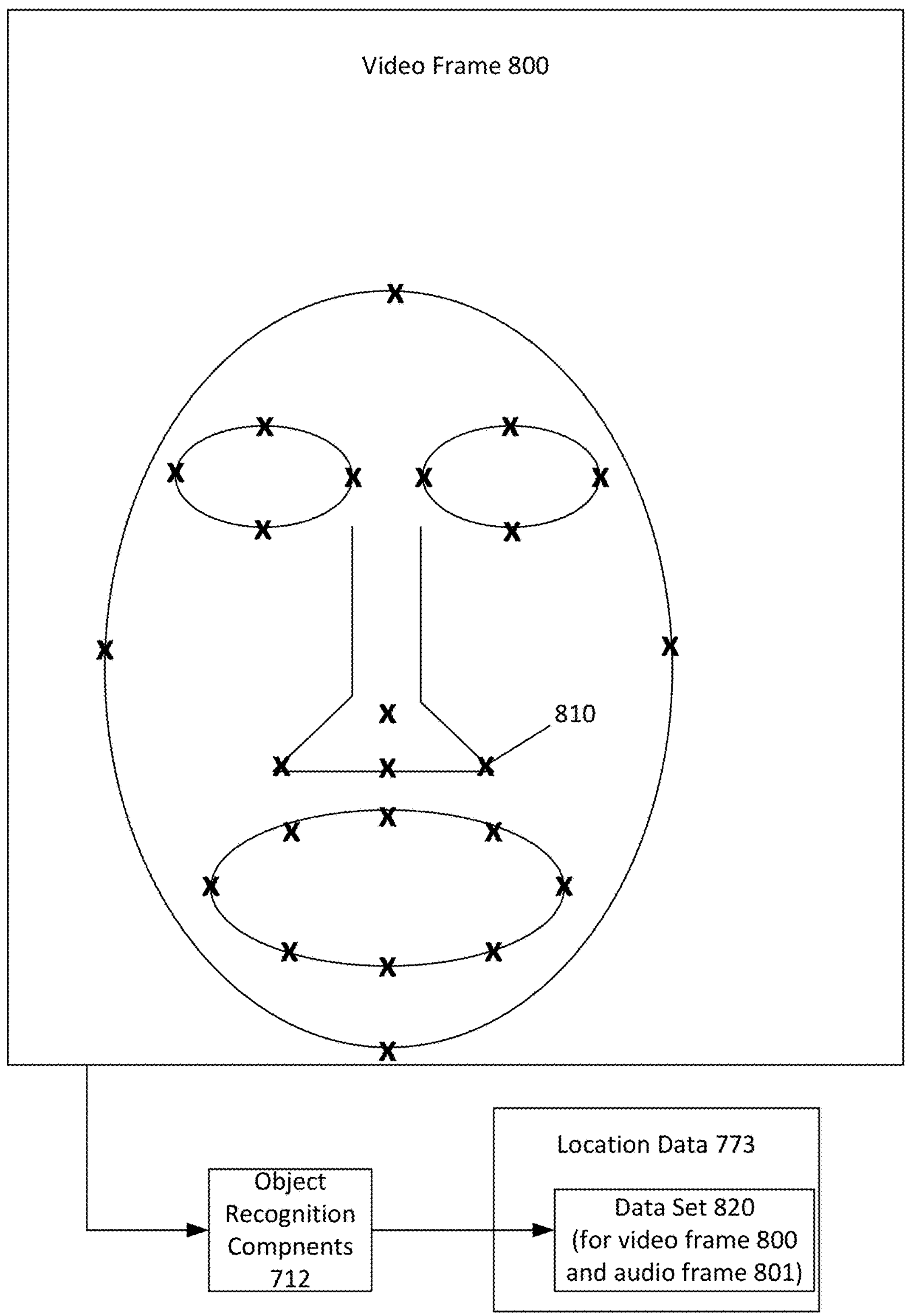
FIG. 8 is diagram illustrating first example location data that may be used in accordance with the present disclosure.
Figure 9:
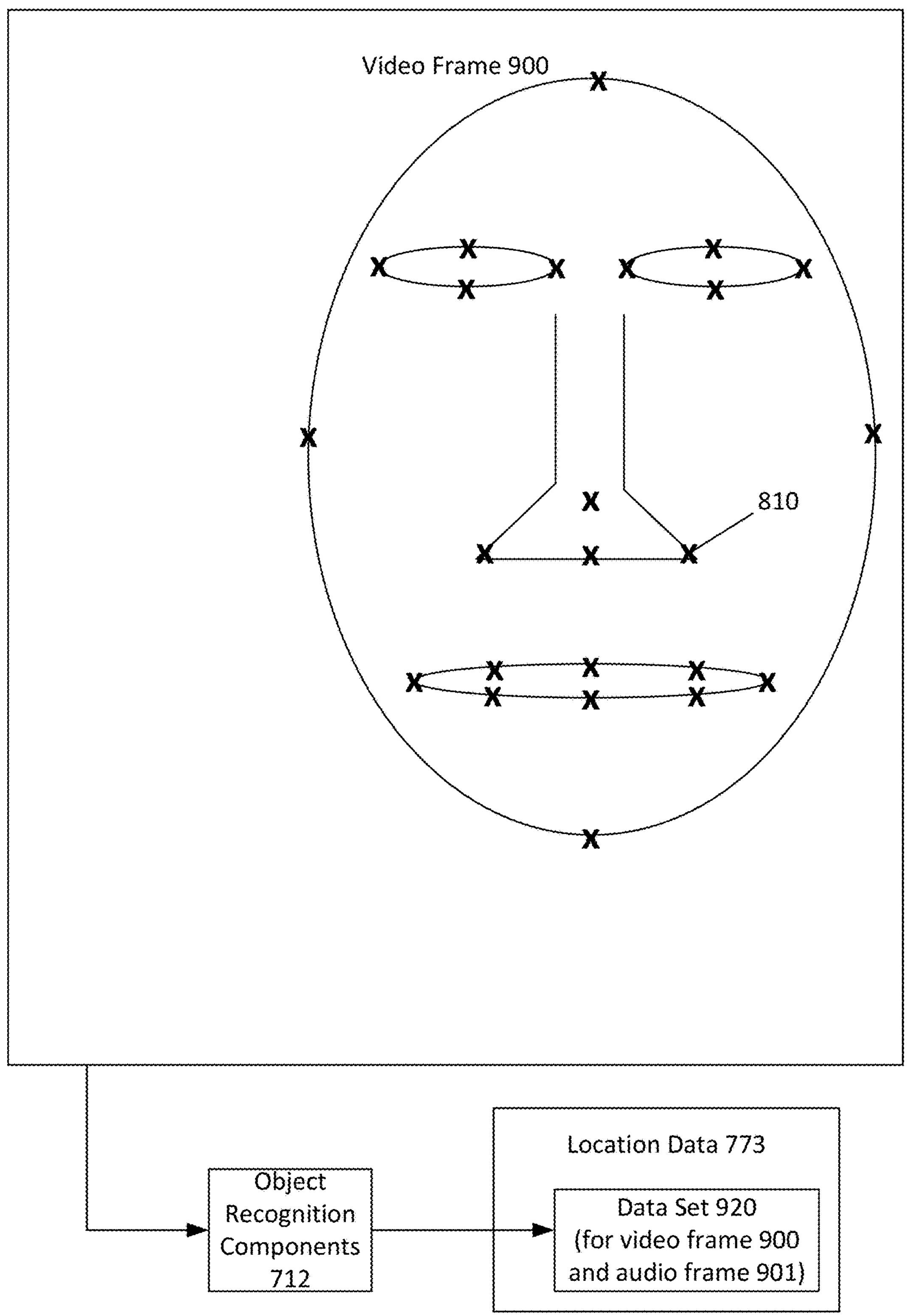
FIG. 9 is a diagram illustrating second example location data that may be used in accordance with the present disclosure.

Referring now to FIGS. 8 and 9, some example data sets of location data 773 will now be described in detail. Specifically, as shown in FIG. 8, a video frame 800, which is included in captured video 772, is provided to object recognition components 712. The object recognition components 712 perform an object recognition analysis on video frame 800 to identify facial features 810 of a person's face that is shown in video frame 800. Each of the facial features 1410 is identified in FIG. 8 using an X symbol. In this example, the facial features 810 correspond to various points of the person's facial components (e.g., lips, nose, eyes and along outer edges of the person's face). The object recognition components 712 may then create a data set 820 corresponding to video frame 800. The data set 1420 may include locations of each of the facial features 810 within video frame 800, such as such as two dimensional (e.g., X and Y) coordinate values for each facial feature 810. In the example of FIG. 8, audio frame 801 corresponds to, and is synchronous with, video frame 800. Thus, in this example, the data set 1420 corresponds to video frame 800 and to audio frame 801.

Referring now to FIG. 9, facial features 810 are shown for a different video frame (video frame 900) of the captured video 772. As shown, the person's face in video frame 900 of FIG. 9 differs in several ways from the same person's face in video frame 800 of FIG. 8. Specifically, in video frame 800, the person's mouth and eyes are wide open. By contrast, in video frame 900, the person's mouth and eyes are more less wide open. Additionally, in video frame 800, the person's face is shown close to the frame's bottom left corner. By contrast, in video frame 900, the person's face has moved up and to the right, and the face is shown closer to the frame's top right corner. In FIG. 9, the object recognition components 712 perform an object recognition analysis on video frame 900 to identify facial features 1410 of a person's face that is shown in video frame 900. The object recognition components 712 may then create a data set 920 corresponding to video frame 900. The data set 920 may include locations of each of the facial features 810 within video frame 900, such as such as two dimensional (e.g., X and Y) coordinate values for each facial feature 810. In the example of FIG. 9, audio frame 901 corresponds to, and is synchronous with, video frame 900. Thus, in this example, the data set 320 corresponds to video frame 900 and to audio frame 901.

Thus, as described above, data sets 820 and 920 may be included in location data 773 and a location data stream 703, which may be transmitted from user node 761 to user node 762 along with audio stream 701 and optionally video stream 702. Referring back to FIG. 7. it is shown that audio stream 701, video stream 702, and location data stream 703 may be received by decoding components 721, which may decode the audio stream 701, video stream 702, and location data stream 703. After being decoded, portions of the audio stream 701 may be buffered at audio buffer 731 and then output as played audio 741, for example via one or more connected audio speakers. Similarly, after being decoded, frames of the video stream 702 may be buffered at video buffer 732 and then displayed as played video 742, for example by a video player via one or more connected display devices. However, as will be described in detail below, every audio frame that is originally included in the captured audio 771 may not be played in the played audio 741. Specifically, one or more frames of the captured audio, such as audio frames that are lost and/or degraded in quality due to decreases in bandwidth, may be replaced with other frames that are generated locally at user node 762, such as location data 773 and/or speaking style data 726.

In the example of FIG. 7. monitoring component 724 executes on user node 762 to determine one or more replaced frames of the captured audio 771. The replaced frames are frames of the captured audio 771 that are not played at the user node 762. In some examples, the replaced frames may include lost frames that are not received by user node 762 (or are received out of order or too late) and frames that are received with poor quality, such as with high amounts of errors or missing or distorted data. In some examples, a temporary reduction in bandwidth may result in one or more lost frames and/or poor quality frames, which may be determined to be replaced frames. Additionally or alternatively, one or more lost and/or poor quality frames may be caused by scenarios in which one or more new participants join an audio-video conference, thereby resulting in additional audio and video streams and higher amounts of transmitted and received data. In some examples, the monitoring component 724 may determine replaced audio frames through various techniques, such as by estimating the incoming bandwidth, based on the amount of incoming data (e.g., quantity of conference participants, etc.), by checking the sequence of incoming audio frames (e.g., to determine lost or missing frames), and/or by determining the quality of incoming audio frames using one or more quality metrics. In some cases, a reduction in quality of incoming frames may be channel-related (e.g., due to a reduction in bandwidth) and/or may be due to compression errors or other errors/corruption. In some examples, the monitoring component 724 may monitor incoming fames to detect when a frame has more than a threshold amount of errors. For example, the monitoring component 724 may monitor incoming fames to detect when a frame has a signal-to-noise ratio that is greater than a threshold signal-to-noise ratio. In some examples, if one or more of these conditions are met, then the frame may be considered to have poor quality and may be determined to be a replaced frame. In some examples, when the monitoring component 724 determines that bandwidth has dropped, the monitoring component 724 may instruct user node 762 to temporarily stop requesting audio content from user node 761 and/or may instruct user node 761 to temporarily stop sending audio content to user node 762. This may help to preserve available bandwidth for other data, such as other content being received by other participants in an audio-video conference.

As shown in FIG. 7. the user node 762 includes an audio frame generator 723, which generates replacements frames 743 that replace the replaced frames within played audio 741. In one specific example, monitoring components 724 may identify a frame number for each frame that is determined to be a replaced frame. The monitoring components 724 may then send the frame numbers of the replaced frames to audio frame generator 723, which may generate a respective replacement frame for each identified frame number of the replaced frames.

Figure 10:
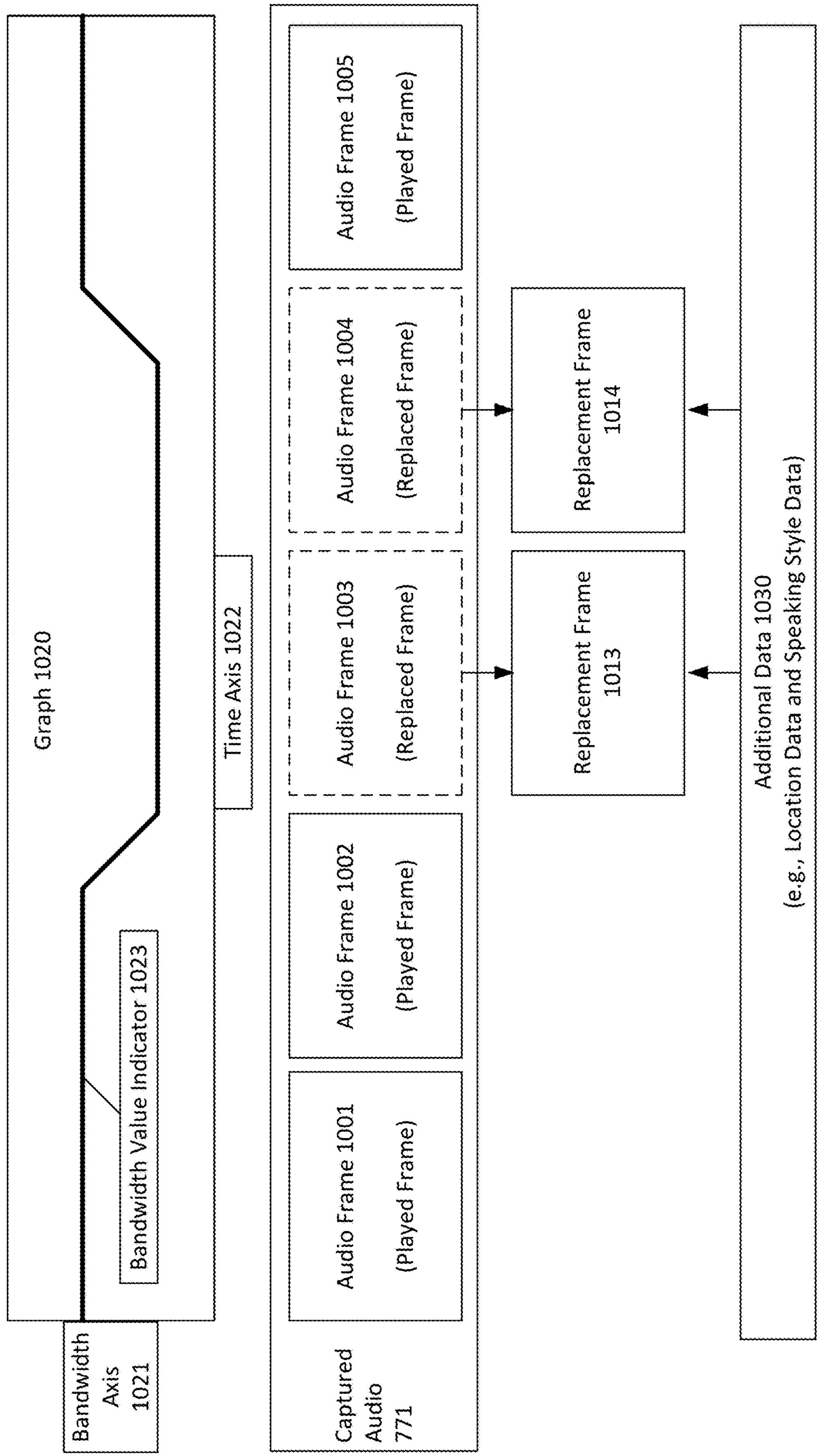
FIG. 10 is a diagram illustrating example replaced frames and replacement frames that may be used in accordance with the present disclosure.

Referring now to FIG. 10, an example is provided in which a graph 1020 shows changes in bandwidth during transmission of captured audio 771 from user node 761 to user node 762. The captured audio 771 includes audio frames 1001-1005. The graph 1020 includes bandwidth axis 1021, which is a vertical axis that reflects bandwidth values that increase from bottom to top. The graph also includes time axis 1022, which is a horizontal axis that reflects the time expired, increasing from left to right, during transmission of the captured audio 771. The bandwidth value indicator 1023 tracks changes in the bandwidth over time during transmission of the captured audio 771. Additionally, in this example, the horizontal positions of audio frames 1001-1005 in FIG. 10 correlate to the time axis 1022 of graph 1020. For example, at the times that audio frames 1001 and

1002 are received by user node 762, the available bandwidth is high, as indicated by the bandwidth value indicator 1023 having a raised vertical position on the left side of graph 1020. In some examples, based on this high available bandwidth, monitoring component 724 may determine that audio frames 1001 and 1002 are played frames that will be played in the played audio 741. However, towards the end of audio frame 1002, the available bandwidth begins to decrease, as indicated by the downward slope of bandwidth value indicator 1023 in graph 1020. As shown, audio frames 1003 and 1004 coincide with a decreased bandwidth, as indicated by the lowered vertical position of bandwidth value indicator 1023 in the middle portion of graph 1020. As a result, audio frames 1003 and 1004 may not be received by user node 762 or may be received with poor quality. In this case, due to this decreased bandwidth, the monitoring component 724 may determine that audio frames 1003 and 1004 are replaced frames. Accordingly, because audio frames 1003 and 1004 are replaced frames, audio frame generator 723 may generate replacement frames 1013 and 1014 to replace audio frames 1003 and 1004, respectively, in the played audio 741. As also shown in FIG. 10, towards the end of audio frame 1004, the available bandwidth begins to increase, as indicated by the upward slope of bandwidth value indicator 1023 in graph 1020. As shown, audio frame 1005 coincides with an increased bandwidth, as indicated by the raised vertical position of bandwidth value indicator 1023 in the right portion of graph 1020. In some examples, based on this increase in available bandwidth, monitoring component 724 may determine that audio frame 1005 is a played frame that will be played in the played audio 741. As will be described in detail below, replacement frames 1013 and 1014 may be generated based at least in part on additional data 1030, such as location data 773 and/or speaking style data 726.

Figure 11:
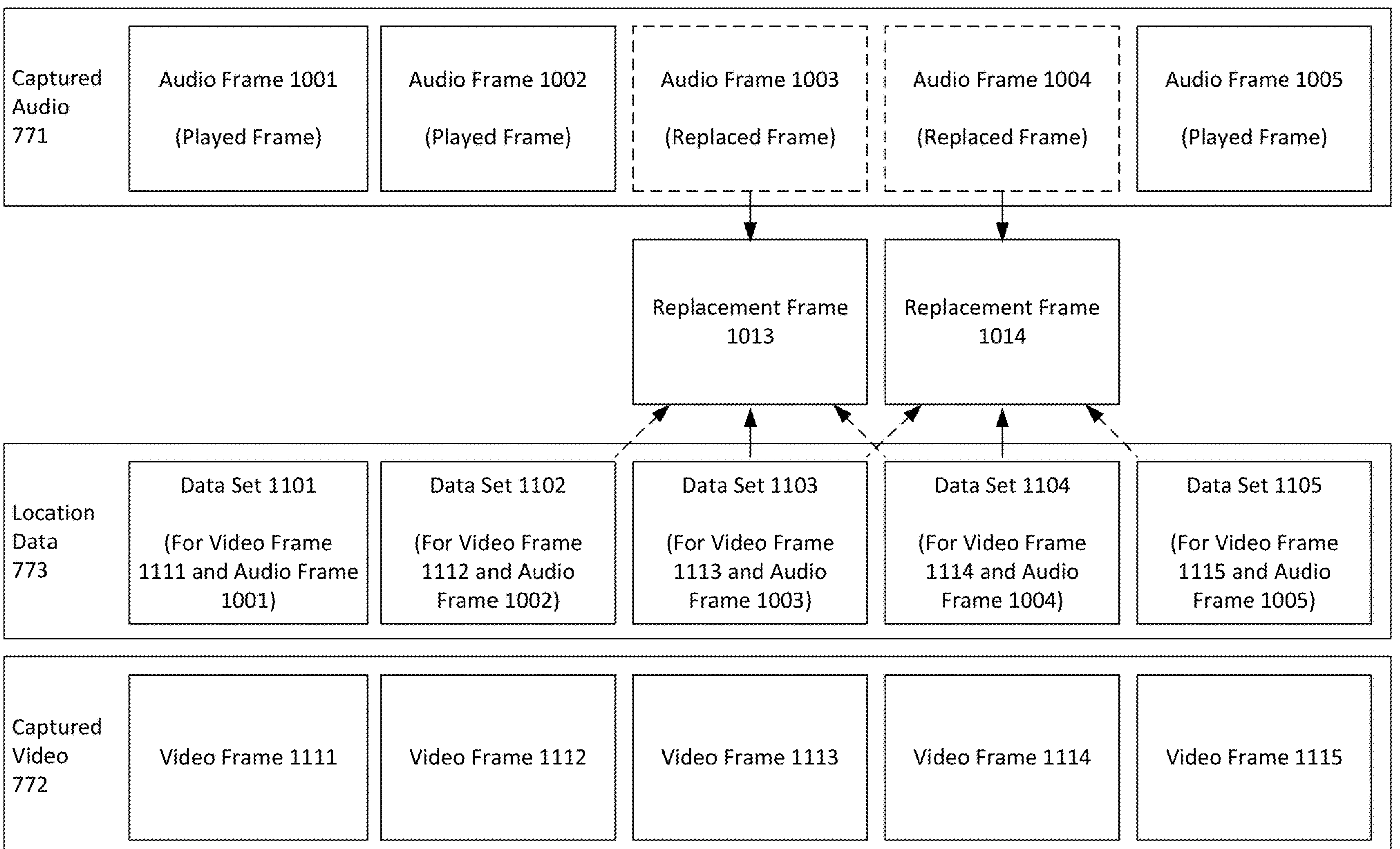
FIG. 11 is a diagram illustrating example audio frame replacement based on location data that may be used in accordance with the present disclosure.

In some examples, audio frame generator 723 may generate replacement frames 1013 and 1014 based at least in part on respective data sets of location data 773 for the corresponding replaced frames (audio frames 1003 and 1004). Referring now to FIG. 11, an example is shown in which location data 773 includes data sets 1101-1105, corresponding to audio frames 1001-1005, respectively. As described above, each data set 1101-1105 may identify locations of facial features, such as facial features 1410 of FIGS. 8 and 9, in respective video frames 1111-1115, such as by identifying two dimensional (e.g., X and Y) coordinate values for each facial feature in the respective video frames 1111-1115. In this example, each data set 1101-1105 corresponds to both a respective one of video frames 1111-1115 and a respective one of audio frames 1001-1005. For example, data set 1101 corresponds to both its respective video frame (video frame 1111) and its respective audio frame (audio frame 1001), while data set 1102 corresponds to both its respective video frame (video frame 1112) and its respective audio frame (audio frame 1002), and so on. In this example, each video frame 1111-1115 is synchronous with its corresponding audio frame 1001-1005, and each audio frame 1001-1005 has a duration that is equal to the frame rate of the captured video 772.

In the example of FIG. 11, replacement frame 1013 is generated based at least in part on data set 1103, which corresponds to audio frame 1003 and identifies locations of facial features in the respective corresponding (e.g., synchronous) video frame (video frame 1113). In some cases, audio output that approximates a portion of the person's speech corresponding to a replaced audio frame (audio frame 1003) may be determined based, at least in part on the locations indicated by the corresponding data set (data set 1103). In some examples, at least one sound spoken by the person may be determined based on the locations indicated by the corresponding data set (data set 1103). For example, the locations indicated by the corresponding data set (data set 1103) may include lip positions (e.g., X and Y coordinate values) of lips of the person in the corresponding video frame (video frame 1113). The at least one sound spoken by the person may then be determined based at least in part on the lip positions. In some examples, output from a machine learning model may indicate a correlation between the at least one sound and the lip positions. For example, in some cases, the machine learning model may generate model data 725 that may indicate correlations between different lip positions and different sounds. For example, in some cases, for given sets and/or ranges of lip positions, the model data 725 may indicate respective sounds that correlate to the sets and/or ranges of lip positions. It is noted that, in addition to lip positions, positions of other facial features may also be used to determine the at least one sound spoken by the person. For example, in some cases, positions of facial features such as eyes may be used (alone or in combination with lip positions) to determine emotions of the speaker, and the emotion of the speaker may also be used to determine sounds and/or speaking styles of the person.

In some examples, in addition to data set 1103, one or more other data sets may also be used to generate replacement frame 1013 in the manner described above, such as one or more other data sets that are in close time proximity to data set 1103, for example the adjacent data sets (data sets 1102 and 1104). In the example of FIG. 11, arrows from data sets 1102 and 1104 to replacement frame 1013 are shown with dashed lines to indicate that data sets 1102 and 1104 may optionally be used to generate replacement frame 1013. Any number of other data sets may also optionally be used to generate replacement frame 1013. Using adjacent data sets (data sets 1102 and 1104), in addition to data set 1103, to generate replacement frame 1013, may be advantageous because it may sometimes be difficult to determine which words and/or sounds a person is making merely from examining location data corresponding to only a single frame.

As also shown in FIG. 11, replacement frame 1014 is generated based at least in part on data set 1104, which corresponds to audio frame 1004 and identifies locations of facial features in the respective corresponding (e.g., synchronous) video frame (video frame 1114). In some examples, in addition to data set 1104, one or more other data sets may also be used to generate replacement frame 1014, such as one or more other data sets that are in close time proximity to data set 1104, for example the adjacent data sets (data sets 1103 and 1105). In the example of FIG. 11, arrows from data sets 1103 and 1105 to replacement frame 1014 are shown with dashed lines to indicate that data sets 1103 and 1105 may optionally be used to generate replacement frame 1014. Any number of other data sets may also optionally be used to generate replacement frame 1014.

Figure 12:
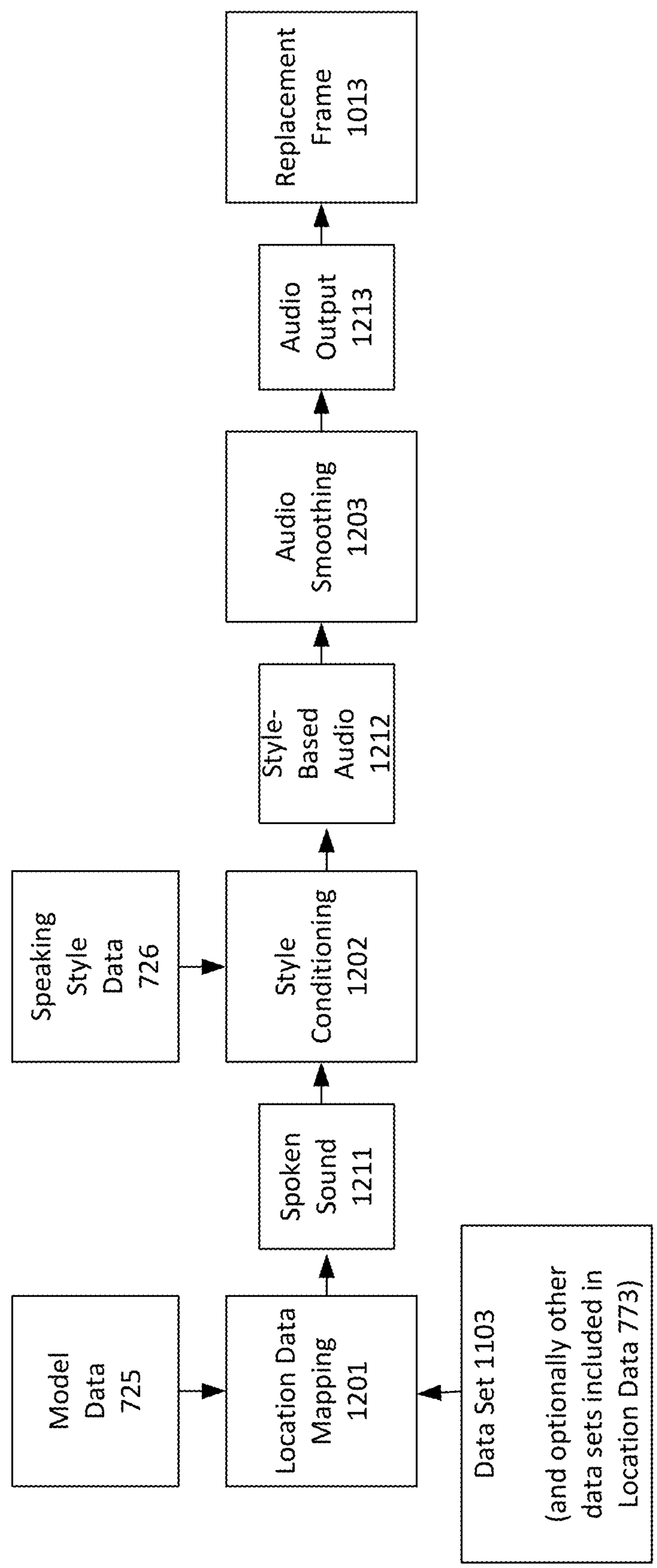
FIG. 12 is a diagram illustrating example components for generation of a replacement audio frame that may be used in accordance with the present disclosure.

In some examples, generation of a replacement frame may include multiple operations. Referring now to FIG. 12, some example operations for generation of a replacement frame will now be described in detail. In the example, of FIG. 12, replacement frame 1013 is generated based on three operations, which include location data mapping 1201, style conditioning 1202, and audio smoothing 1203. In some examples, location data mapping 1201, style conditioning 1202, and audio smoothing 1203 may be performed by audio frame generator 723 of FIG. 7. Specifically, during location data mapping 1201, location data (e.g., key points of lip positions) from a corresponding data set, which is data set 1103, and optionally other data sets (e.g., data sets 1102 and 1104) is mapped to spoken sound 1211, which is at least one sound that is spoken, irrespective of speaking style, by the person speaking in captured audio 771. In some examples, audio frame generator 723 may have access to model data 725 that indicates various lip positions corresponding to various different sounds, such as lip positions that are used to make the different sounds. In some examples, model data 725 may be based on a learned model, such as may be determined by artificial neural networks and machine learning techniques. For example, in some cases, clips of video and corresponding audio may be provided as input to machine learning algorithms, which may over time analyze the input to correlate various lip movements and lip positions shown in the video clips with corresponding sounds in the audio clips. In some examples, the audio frame generator 723 may examine data set 1103 (and optionally other data sets) to determine the person's lip positions corresponding to the replaced frame (audio frame 1003). The audio frame generator 723 may then use model data 725 to determine at least one sound that is mapped to the corresponding lip positions. The at least one sound that is mapped to the corresponding lip positions may be spoken sound 1211. It is noted that the spoken sound 1211 refers to a sound (e.g., word, portion of a word and/or phoneme) that is spoken by the speaker irrespective of the speaker's speaking style. Thus, there is no requirement that spoken sound 1211 must match the exact speech of the person that is captured in captured audio 771 (which may be made using the person's speaking style).

In some examples, location data mapping 1201 may employ reinforcement learning (e.g., peer feedback) to improve its accuracy. For example, this can be done in real-time where the model gets feedback from clients with reliable audio signals to improve the prediction of subsequent audio frames or it can be done offline to avoid computational complexity during the audio/video session. In some examples, audio data from a given frame, as well as additional data (e.g., location data and/or speaking style data), may be used to make a prediction regarding the contents of future frames. If the future frame is not received (or is received with poor quality), then the prediction of the contents of the future frame may then be used to assist in generating a replacement frame to replace the future frame. By contrast, if a high quality version of the future frame is successfully received, then the predicted contents of the future frame may be compared to the actual contents of the future frame, such as to assist in improving the accuracy of subsequent predictions.

In some cases, once the spoken sound 1211 is determined based on the location data mapping 1201, the spoken sound 1211 may then be conditioned, during style conditioning 1202, based on speaking style data 726 that corresponds to a speaking style of the person. In some examples, the spoken sound 1211 may be represented using a frequency domain (e.g., mel spectrogram) representation, and the frequency domain representation may be modified based on the speaking style data 726 to match the person's speaking style. Also, in some examples, the spoken sound 1211 may be a word, portion of a word, and/or a phoneme spoken by the person, and the speaking style data 726 may be applied to the at least one sound to cause the word, portion of a word, and/or a phoneme to be spoken in the person's speaking style Thus, spoken sound 1211 may be conditioned using the speaking style data 726 to form style-based audio 1212, which includes the spoken sound 1211 in a style that matches the person's speaking style.

In some examples, the speaking style data 726 may include a d-vector or other data representation (e.g., embedding) of the person's speaking style. In some examples, the speaking style data 726 may be computed and updated throughout the audio transmission session for captured audio 771. The speaking style data 726 may be unique for each speaker and may allow conditioning of the replacement frame 1013 in the corresponding source speaker style. In some examples, the computation of speaking style data 726 may be performed locally at user node 762. In other examples, the computation could be performed wholly or partially by another device or server that may receive captured audio 771 and may, in turn, send results of the computation to user node 762. In yet other examples, the computation may be performed before the transmission of captured audio 771 begins. For example, the speaking style data representation may be computed based on an analysis of previously captured audio data from the same speaker. In some examples, clients can share speaking style data 726 as in a peer-to-peer network or may obtain speaking style data 726 from a service.

The speaking style data 726 may include data that indicates the speaker's speaking style. The term speaking style, as used herein, refers to nonphonemic paralinguistic speaking characteristics, such as pitch, tone, volume, intonation and prosody. The speaking style data 726 may be calculated by obtaining audio samples of speech from the speaker and analyzing the audio samples to determine the speaking style. In some examples, the speaking style data may be obtained using an encoder (e.g., a style-extraction encoder) or other component that is trained to extract speaking style characteristics from samples of a person's speech. In some examples, this training process may be performed using a neural network model. One specific technique for training of a style-extraction encoder is described above, for example with reference to FIG. 3.

In one specific example, the audio encoding and decoding system described above with reference to FIGS. 1-6 may be employed to perform style conditioning 1202. For example, in some cases, the at least one sound that may be determined during the location data mapping 1201 may be used to form content-extracted data 131 of FIG. 1. Additionally, in some examples, other audio captured from the same speaker may be used as second input audio sample 102 and/or second input data 112 of FIG. 1. As described above, the style extraction encoder 122 of FIG. 1 may be employed to form style-extracted data 132. In this example, the style-extracted data 132 may be used as the speaking style data 726, which is employed to condition the at least one sound to match the person's speaking style. The content-extracted data 131 (e.g., the at least one sound formed by location data mapping 1201) and the style-extracted data 132 (e.g., the speaking style data 726) may then be provided to decoder 140 to form the output data for inclusion in the replacement frame 1013. It is noted, however, that any number of other techniques may be employed to perform style conditioning 1202. For example, in some cases, key points can be mapped directly to phonemes, from which words may be generated. From words, mel spectrograms may be generated, for example using text-to-speech based models conditioned on the speaker's style.

Audio smoothing 1203 may be performed on the style-based audio 1212 to generate audio output 1213. Audio smoothing 1203 may help to ensure that the audio output

1213 blends well with the played audio 741. The smoothing technique may align the generated audio output 1213 with the played audio 741 and may also perform adjustments to the audio duration, volume, and signal strength of the style-based audio 1212. For example, the audio output 1213 may be smoothed by setting one or more characteristics (e.g., volume, signal strength, etc.) of the audio output 1213 to blend with adjacent portions of the captured audio 771, by setting a duration of the audio content to match the duration of the replaced audio content, and/or using other techniques.

Figure 13:
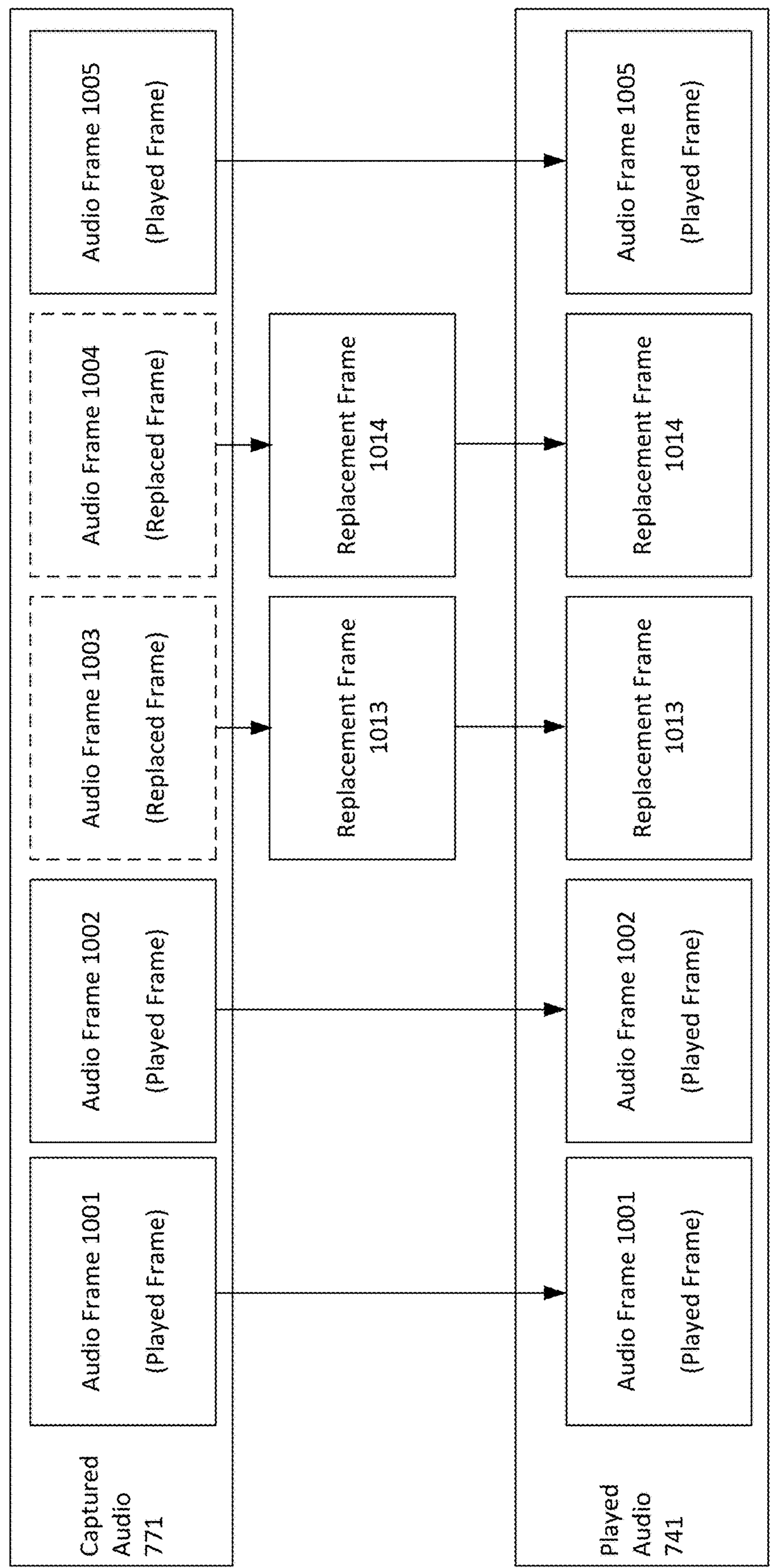
FIG. 13 is a flowchart illustrating example played audio content with replacement frames that may be used in accordance with the present disclosure.

Referring now to FIG. 13, it is shown that the played audio 741, which is audio content that is played to user at the user node 762, may include the played frames from the captured audio 771 (which includes audio frames 1001, 1002 and 1005) as well as the replacement frames 1013 and 1014. In this manner, the replacement frames 1013 and 1014 replace the corresponding replaced frames (audio frames 1003 and 1004) in the played audio 741. Thus, by generating the replacement frames 1013 and 1014 based on the location data 773 and/or speaking style data 726, the techniques described herein may allow high quality audio to be consistently played to users, even during periods of reduced bandwidth and while audio-video conferencing with large quantities of other participants.

FIG. 14 is a flowchart illustrating an example audio frame replacement process that may be used in accordance with the present disclosure. The process of FIG. 14 is initiated at operation 1410, at which played audio frames included in first audio content (e.g., captured audio 771 of FIG. 1) are received over one or more networks. For example, user node 762 of FIG. 7 may receive audio frames 1001, 1002 and 1005 of FIGS. 10-13 over one or more networks. As shown in FIGS. 10-13, audio frames 1001, 1002 and 1005 are played frames that are included in captured audio 771. The first audio content further includes a replaced audio frame (and potentially multiple replaced audio frames). For example, as shown in FIGS. 10-13, the captured audio 771 further includes audio frames 1003 and 1004, which are replaced audio frames. In some examples, the replaced audio frames may not be received by user node 762 or may be received with poor quality, for example due to a reduction in network bandwidth associated with the replaced audio frames. The first audio content received at operation 1410 corresponds to video content that includes video of a face of a person as the person utters speech that is captured in the first audio content. As described above, in some examples, the first audio content and the video content may be generated as part of an audio-video conferencing session.

At operation 1412, location data is received over the one or more networks. For example, as shown in FIG. 7. user node 762 may receive location data 773 over one or more network(s) 750 via location data stream 703. The location data received at operation 1412 indicates locations of facial features of the face of the person in a video frame of the video content, wherein the video frame corresponds to the replaced audio frame. For example, as shown in FIG. 11, the location data 773 includes a data set 1103, which indicates locations of facial features of a face of the person within video frame 1113, which corresponds to (e.g., is at least partially synchronous with) a replaced audio frame (audio frame 1003). As described above, an object recognition analysis may be performed on the video frame (video frame 1113) to determine the locations of the facial features.

At operation 1414, a determination is made to replace a replaced audio frame of the first audio content with a replacement audio frame. In some examples, this determination may be made based at least in part on a reduction in bandwidth associated with the replaced audio frame. For example, as shown in FIG. 10, a reduction in bandwidth occurs just before transmission of audio frame 1003, as indicated by graph 1020. This reduction in bandwidth may result in a determination to replace audio frame 1003 with replacement frame 1013. As described above, in some examples, the reduction in bandwidth may cause the replaced frame to not be received or to be received with poor quality (e.g., high amounts of errors, etc.). In some examples, a monitoring component may estimate the available bandwidth and determine to replace one or more frames that are transmitted and/or received during times when the bandwidth is reduced. In some cases, the monitoring component may monitor incoming frame numbers of incoming frames to determine when frames are not received. Additionally, in some examples, the monitoring component may determine the quality of incoming audio frames using one or more quality metrics. In some cases, a reduction in quality of incoming frames may be channel-related (e.g., due to a reduction in bandwidth) and/or may be due to compression errors or other errors/corruption. In some examples, the monitoring component may monitor incoming fames to detect when a frame has more than a threshold amount of errors. For example, the monitoring component may monitor incoming fames to detect when a frame has a signal-to-noise ratio that is greater than a threshold signal-to-noise ratio. In some examples, if one or more of these conditions are met, then the frame may be considered to have poor quality and may be determined to be a replaced frame.

At operation 1416, audio output that approximates a portion of the speech corresponding to the replaced audio frame is generated based at least in part on the locations indicated by the location data. In some examples, generating of the audio output may include performing sub-operations 1416A-C. At sub-operation 1416A, at least one sound spoken by the person, irrespective of a speaking style of the person, is determined based on the locations indicated by the location data. In some examples, the locations indicated by the location data may comprise lip positions, and the at least one sound may be determined based at least in part on the lip positions. For example, as shown in FIG. 12, the corresponding data set (data set 1103) and optionally other data sets (e.g., data sets 1102 and 1104) are used to determine spoken sound 1211, which is at least one sound spoken by the person irrespective of a speaking style of the person. In some examples, the audio frame generator 723 may examine data set 1103 (and optionally other data sets) to determine the person's lip positions corresponding to the replaced frame (audio frame 1003). Data from a machine learning model, such as model data 725, may indicate a correlation between the lip positions and the at least one sound. The audio frame generator 723 may then use model data 725 to determine at least one sound that is mapped to the corresponding lip positions. The at least one sound that is mapped to the corresponding lip positions may be spoken sound 1211.

At sub-operation 1416B, speaking style data is applied to the at least one sound to form style-based audio corresponding to the speaking style of the person. For example, as shown in FIG. 12, style conditioning 1202 may be performed on the spoken sound 1211, using speaking style data 726, to form style-based audio 1212. The speaking style data 726 may corresponds to a speaking style of the person. In some examples, the spoken sound 1211 may be represented using a frequency domain (e.g., mel spectrogram) representation, and the frequency domain representation may be modified based on the speaking style data 726 to match the person's speaking style. Also, in some examples, the spoken sound 1211 may be a word, portion of a word, and/or a phoneme spoken by the person, and the speaking style data 726 may be applied to the at least one sound to cause the word, portion of a word, and/or a phoneme to be spoken in the person's speaking style. Thus, spoken sound 1211 may be conditioned using the speaking style data 726 to form style-based audio 1212, which includes the spoken sound 1211 in a style that matches the person's speaking style.

In some examples, the speaking style data 726 may be generated based at least in part on one or more preceding audio frames that precede the replaced audio frame in the first audio content. In some examples, the speaking style data 726 may be computed and updated throughout the audio transmission session for captured audio 771. The speaking style data 726 may be unique for each speaker and may allow conditioning of the replacement frame 1013 in the corresponding source speaker style. In one specific example, the audio encoding and decoding system described above with reference to FIGS. 1-6 may be employed to perform style conditioning 1202. In some examples, the computation of speaking style data 726 may be performed locally at user node 762. In other examples, the computation could be performed wholly or partially by another device or server that may receive captured audio 771 and may, in turn, send results of the computation to user node 762. In yet other examples, the computation may be performed before the transmission of captured audio 771 begins.

At sub-operation 1416C, audio smoothing is performed on the style-based audio. For example, as shown in FIG. 12, audio smoothing 1203 may be performed on the style-based audio 1212 to generate audio output 1213. Audio smoothing 1203 may help to ensure that the audio output 1213 blends well with the played audio 741. The smoothing technique may align the generated audio output 1213 with the played audio 741 and may also perform adjustments to the audio duration, volume, and signal strength of the style-based audio 1212. For example, the audio output 1213 may be smoothed by setting one or more characteristics (e.g., volume, signal strength, etc.) of the audio output 1213 to blend with adjacent portions of the captured audio 771, by setting a duration of the audio content to match the duration of the replaced audio content, and/or using other techniques.

At operation 1418, the audio output is inserted into a replacement audio frame. For example, this may include inserting the audio output into a portion of the played audio content at a location within the played audio content that would have otherwise been occupied by the replaced frame (if the replaced frame had not been replaced). For example, as shown in FIG. 13, replacement frame 1013 is positioned in played audio 741 at a location within the played audio content that would have otherwise been occupied by audio frame 1003, which is the location immediately following audio frame 1002. Thus, the audio output may be inserted into replacement frame 1013 by inserting the audio output into a portion of played audio 741 that immediately follows audio frame 1002. It is noted that audio smoothing performed at operation 1416C may ensure that the inserted audio output has the appropriate time duration, such as a time duration equivalent to audio frame 1003.

At operation 1420, second audio content (e.g., played audio 741 of FIG. 13) is played. The played audio content includes the played audio frames and the replacement audio frame. The replacement audio frame replaces the replaced audio frame in the second audio content. For example, as shown in FIG. 13, played audio 741 includes audio frames 1001, 1002 and 1005, which are the played audio frames, as well as replacement frames 1013 and 1014. The replacement frames 1013 and 1014 replace the corresponding replaced frames (audio frames 1003 and 1004) in the played audio 741.

It is noted that, in some of the above described examples, the location data may be computed on the transmitting device/node that captures the image data. For example, as shown in FIG. 7. location data 773 may be computed by object recognition components 712 on user node 761. It is noted, however, that there is no requirement that location data must be computed on the same transmitting device/node that captures the image data. For example, in some cases, captured video 772 may be streamed from the user node 761 to a cloud service (or other service or node). The cloud service could then execute an object recognition process to compute the location data 773. The location data 773 could then be transmitted from the cloud service to the user node 762 and employed by the user node 762 to generate the replacement frames 743. In some examples, this strategy may sometimes be employed when the transmitting node (e.g., user node 761) has a high bandwidth connection and the receiving node (e.g., user node 762) has a low bandwidth connection. In some cases, this technique could be further advantageous, such as by potentially reducing an amount of processing and calculations that are performed at the transmitting node.

Additionally, in some of the above described examples, the replacement frames are generated on the receiving device/node. For example, as shown in FIG. 7. replacement frames 743 may be generated by audio frame generator 723 on user node 762. It is noted, however, that there is no requirement that replacement frames must be generated on the receiving device/node. For example, in some cases, location data 773 may be streamed from the user node 761 to a cloud service (or other service or node). The cloud service could then generate the replacement frames 743 using the techniques described above. The cloud service could then send the replacement frames 743 to the user node 762 to be played at the user node 762. In some examples, this strategy could be employed when the transmitting node (e.g., user node 761) has a low bandwidth connection and the receiving node (e.g., user node 762) has a high bandwidth connection. In some cases, this technique could be further advantageous, such as by potentially reducing an amount of processing and calculations that are performed at the receiving node.

Figure 15:
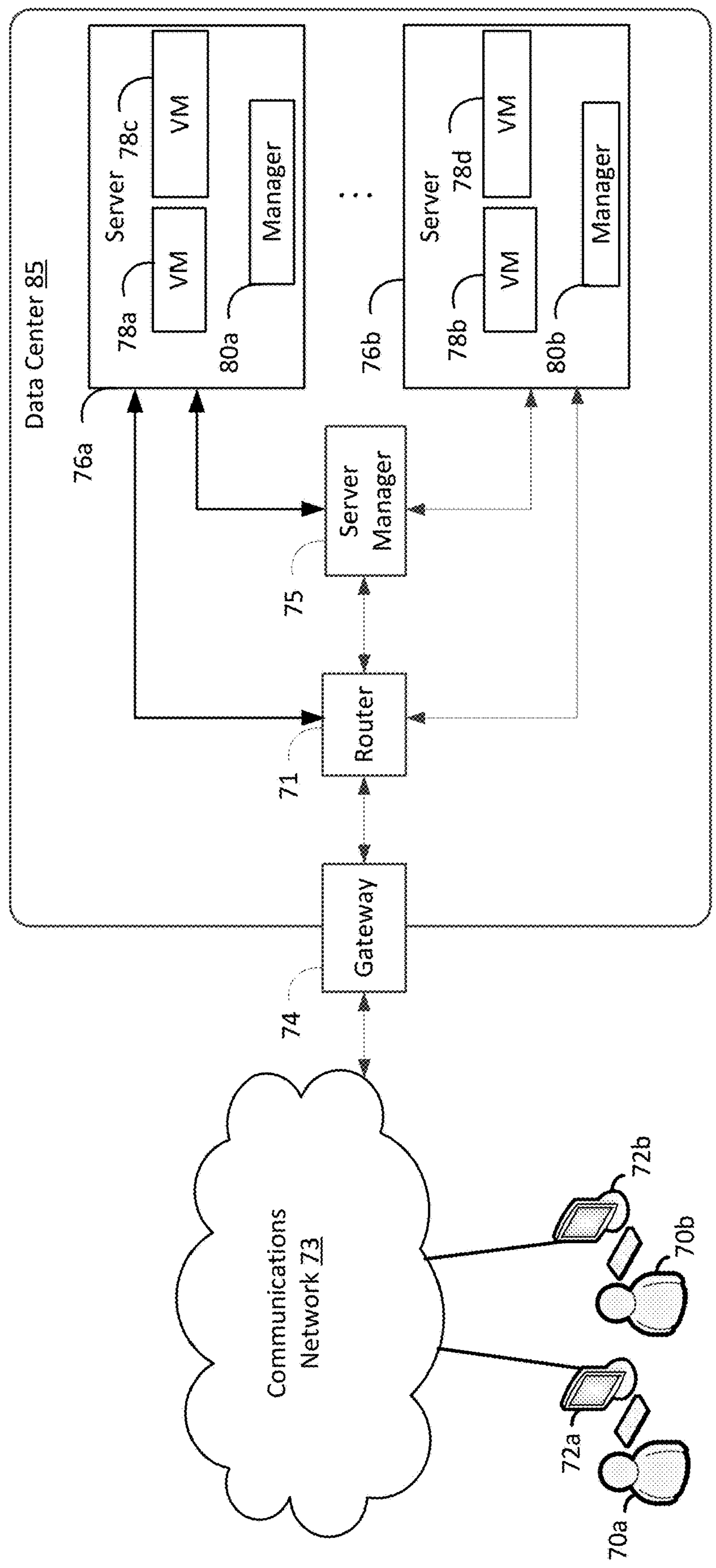
FIG. 15 is a diagram illustrating an example system for transmitting and providing data that may be used in accordance with the present disclosure.

An example system for transmitting and providing data will now be described in detail. In particular, FIG. 15 illustrates an example computing environment in which the embodiments described herein may be implemented. FIG. 15 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 15, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72*a* or 72*b* may be a server, a desktop or laptop personal computer, a tablet computer, a wireless telephone, a personal digital assistant (PDA), an e-book reader, a game console, a set-top box or any other computing device capable of accessing data center 85. User computer 72*a* or 72*b* may connect directly to the Internet (e.g., via a cable modem or a Digital Subscriber Line (DSL)). Although only two user computers 72*a* and 72*b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 15 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80*a* or 80*b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 15, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 15, a server manager 75 is also employed to at least in part direct various communications to, from and/or between servers 76*a* and 76*b*. While FIG. 15 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 15 has been greatly simplified and that many more networks and networking devices may be utilized to interconnect the various computing systems disclosed herein. These network topologies and devices should be apparent to those skilled in the art.

It should also be appreciated that data center 85 described in FIG. 15 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 16:
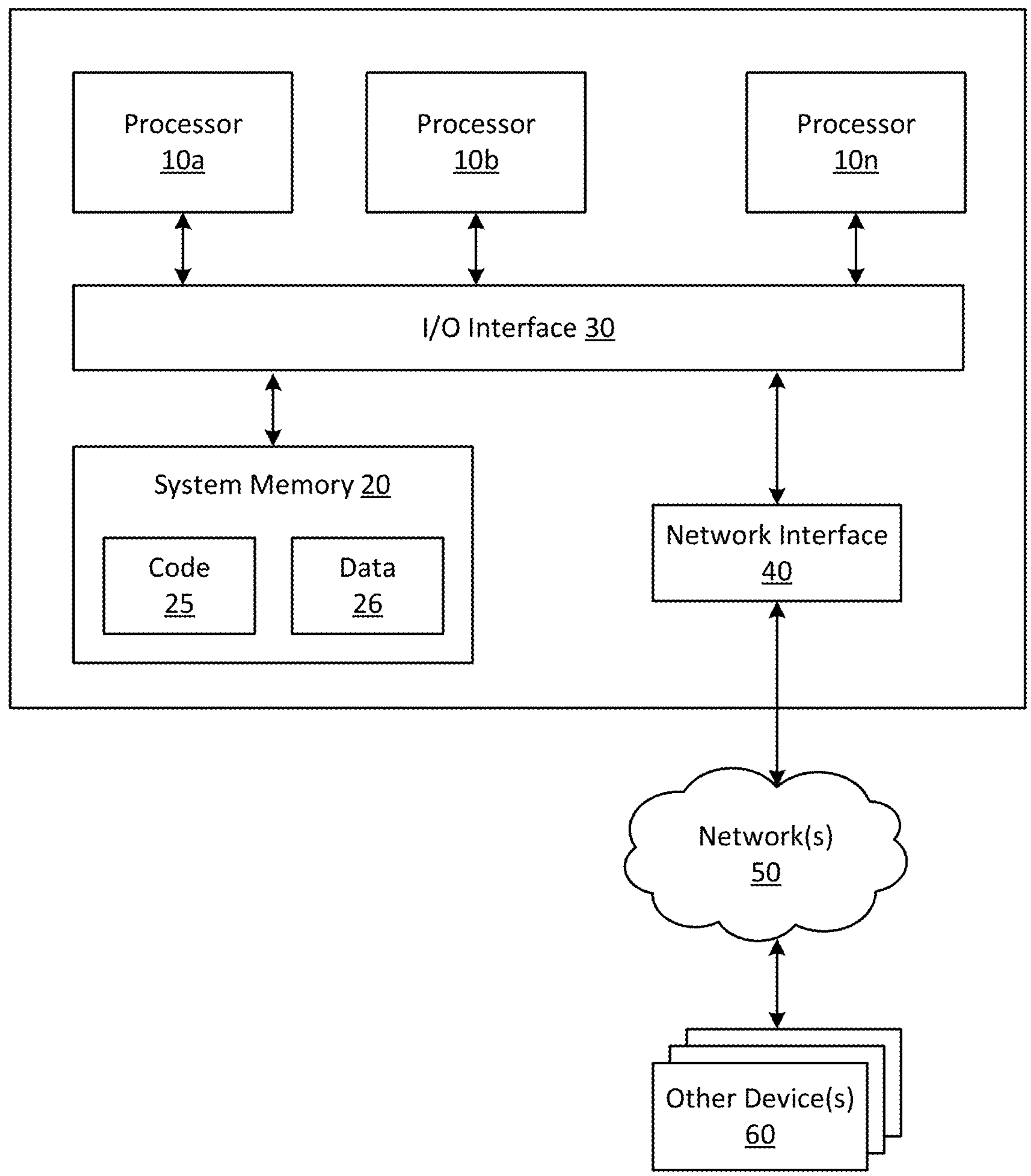
FIG. 16 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 16 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
receiving, over one or more networks, played audio frames included in first audio content, wherein the first audio content further includes a replaced audio frame, wherein the first audio content corresponds to video content that includes video of a face of a person as the person utters speech that is captured in the first audio content;
receiving, over the one or more networks, location data that indicates locations of facial features of the face of the person in a video frame of the video content, wherein the video frame corresponds to the replaced audio frame;
determining, based at least in part on a reduction in bandwidth associated with the replaced audio frame, to replace the replaced audio frame with a replacement audio frame
generating, based at least in part on the locations indicated by the location data, audio output that approximates a portion of the speech corresponding to the replaced audio frame;
inserting the audio output into the replacement audio frame; and
playing second audio content including the played audio frames and the replacement audio frame, wherein the replacement audio frame replaces the replaced audio frame in the second audio content.

2. The computing system of claim 1, wherein the generating the audio output comprises:
determining, based on the locations indicated by the location data, at least one sound spoken by the person irrespective of a speaking style of the person.

3. The computing system of claim 2, wherein the generating the audio output further comprises:
applying speaking style data to the at least one sound to form style-based audio corresponding to the speaking style of the person.

4. The computing system of claim 3, wherein the generating the audio output further comprises:
performing audio smoothing on the style-based audio to form the audio output.

5. A computer-implemented method comprising:
receiving, over one or more networks, played audio frames included in first audio content, wherein the first audio content further includes a replaced audio frame, wherein the first audio content corresponds to video content that includes video of a face of a person as the person utters speech that is captured in the first audio content;

receiving, over the one or more networks, location data that indicates locations of facial features of the face of the person in a video frame of the video content, wherein the video frame corresponds to the replaced audio frame;

generating, based at least in part on the locations indicated by the location data, audio output that approximates a portion of the speech corresponding to the replaced audio frame;

inserting the audio output into a replacement audio frame; and playing second audio content including the played audio frames and the replacement audio frame, wherein the replacement audio frame replaces the replaced audio frame in the second audio content.

6. The computer-implemented method of claim 5, wherein the generating the audio output comprises:

determining, based on the locations indicated by the location data, at least one sound spoken by the person irrespective of a speaking style of the person.

7. The computer-implemented method of claim 6, wherein the generating the audio output further comprises:

applying speaking style data to the at least one sound to form style-based audio corresponding to the speaking style of the person.

8. The computer-implemented method of claim 7, wherein the generating the audio output further comprises:

performing audio smoothing on the style-based audio.

9. The computer-implemented method of claim 7, wherein the speaking style data is generated based at least in part on one or more preceding audio frames that precede the replaced audio frame in the first audio content.

10. The computer-implemented method of claim 6, wherein the locations indicated by the location data comprise lip positions, and wherein the at least one sound is determined based at least in part on the lip positions.

11. The computer-implemented method of claim 10, wherein data from a machine learning model indicates a correlation between the lip positions and the at least one sound.

12. The computer-implemented method of claim 5, wherein an object recognition analysis is performed on the video frame to determine the locations of the facial features.

13. The computer-implemented method of claim 5, further comprising determining, based at least in part on a reduction in bandwidth associated with the replaced audio frame, to replace the replaced audio frame with the replacement audio frame.

14. One or more non-transitory computer-readable storage media having stored thereon computing instructions that, upon execution by one or computing devices, cause the one or more computing devices to perform operations comprising:

receiving, over one or more networks, played audio frames included in first audio content, wherein the first audio content further includes a replaced audio frame, wherein the first audio content corresponds to video content that includes video of a face of a person as the person utters speech that is captured in the first audio content;

receiving, over the one or more networks, location data that indicates locations of facial features of the face of the person in a video frame of the video content, wherein the video frame corresponds to the replaced audio frame;

generating, based at least in part on the locations indicated by the location data, audio output that approximates a portion of the speech corresponding to the replaced audio frame;

inserting the audio output into a replacement audio frame; and playing second audio content including the played audio frames and the replacement audio frame, wherein the replacement audio frame replaces the replaced audio frame in the second audio content.

15. The one or more non-transitory computer-readable storage media of claim 14, wherein the generating the audio output comprises:

determining, based on the locations indicated by the location data, at least one sound spoken by the person irrespective of a speaking style of the person.

16. The one or more non-transitory computer-readable storage media of claim 15, wherein the generating the audio output further comprises:

applying speaking style data to the at least one sound to form style-based audio corresponding to the speaking style of the person.

17. The one or more non-transitory computer-readable storage media of claim 16, wherein the generating the audio output further comprises:

performing audio smoothing on the style-based audio.

18. The one or more non-transitory computer-readable storage media 15, wherein the locations indicated by the location data comprise lip positions, and wherein the at least one sound is determined based at least in part on the lip positions.

19. The one or more non-transitory computer-readable storage media of claim 18, wherein data from a machine learning model indicates a correlation between the lip positions and the at least one sound.

20. The one or more non-transitory computer-readable storage media of claim 14, wherein the operations further comprise:

determining, based at least in part on a reduction in bandwidth associated with the replaced audio frame, to replace the replaced audio frame with the replacement audio frame.

* * * * *